United States Patent
Akiyama et al.

(10) Patent No.: US 7,688,973 B2
(45) Date of Patent: Mar. 30, 2010

(54) ENCRYPTION APPARATUS, DECRYPTION APPARATUS, KEY GENERATION APPARATUS, PROGRAM, AND METHOD

(75) Inventors: Koichiro Akiyama, Tokyo (JP); Yasuhiro Goto, Hakodate (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1343 days.

(21) Appl. No.: 11/128,283

(22) Filed: May 13, 2005

(65) Prior Publication Data
US 2005/0271203 A1    Dec. 8, 2005

(30) Foreign Application Priority Data
May 19, 2004    (JP)    ............... 2004-149052

(51) Int. Cl.
H04L 9/30    (2006.01)
H04L 9/14    (2006.01)
(52) U.S. Cl. .......................................... 380/30; 380/28
(58) Field of Classification Search ......... 713/182–186, 713/150–154, 160–167, 189–193; 726/17, 726/18, 28, 29, 35, 256, 10; 380/256, 211, 380/260, 262, 259, 28, 30; 709/225, 229
See application file for complete search history.

(56) References Cited

U.S. PATENT DOCUMENTS 6,233,340 B1 * 5/2001 Sandru .......................... 380/51
2002/0001383 A1 * 1/2002 Kasahara ...................... 380/30
2004/0151309 A1 * 8/2004 Gentry et al. ................. 380/30

OTHER PUBLICATIONS

Tsuyoshi Takagi, Shozo Naito; "The Multi-variable Modular Polynomial and Its Applications to Cryptography"; Dec. 16-18, 1996; Proceedings of the 7th International Symposium on Algorithms and Computation.*
Wikipedia, Hopf fibration, http://en.wikipedia.org/wiki/Hopf_bundle.*
U.S. Appl. No. 11/220,641, filed Sep. 8, 2005, Koichiro Akiyama, et al.
U.S. Appl. No. 11/426,450, filed Jun. 26, 2006, Akiyama, et al.
U.S. Appl. No. 11/565,204, filed Nov. 30, 2006, Akiyama, et al.
U.S. Appl. No. 11/685,302, filed Mar. 13, 2007, Akiyama, et al.
U.S. Appl. No. 12/266,027, filed Nov. 6, 2008, Akiyama, et al.
U.S. Appl. No. 12/352,083, filed Jan. 12, 2009, Akiyama, et al.

* cited by examiner

*Primary Examiner*—Taghi T Arani
*Assistant Examiner*—Mohammad L Rahman
(74) *Attorney, Agent, or Firm*—Oblon, Spivak, McClelland, Maier & Neustadt, L.L.P.

(57) ABSTRACT

According to each embodiment of this invention, an encryption apparatus, decryption apparatus, and key generation apparatus based on a public-key cryptographic scheme whose security is based on the divisor finding problem of obtaining a divisor on an algebraic surface which is a difficult problem that has not been solved by contemporary mathematics are realized by an arrangement using, as a private key, a section D of algebraic curves (divisors) on a fibration $X(x, y, t)$ of an algebraic surface X. This makes it possible to create a public-key cryptographic scheme which can ensure security even in the advent of a quantum computer, can be securely realized by even current computers, and can be realized in a low-power environment.

18 Claims, 13 Drawing Sheets ved in real time, such as a pay digital broadcast. In this case, a

ENCRYPTION APPARATUS, DECRYPTION APPARATUS, KEY GENERATION APPARATUS, PROGRAM, AND METHOD

CROSS-REFERENCE TO RELATED APPLICATIONS

This application is based upon and claims the benefit of priority from prior Japanese Patent Application No. 2004-149052, filed May 19, 2004, the entire contents of which are incorporated herein by reference.

BACKGROUND OF THE INVENTION

1. Field of the Invention

The present invention relates to an encryption apparatus, decryption apparatus, key generation apparatus, program, and method which are based on a public-key cryptosystem using algebraic surfaces.

2. Description of the Related Art

In a networked society, people communicate with each other by transmitting a large amount of information such as e-mail on networks. In such a networked society, cryptographic technologies are widely used as a means for protecting confidentiality and authenticity.

Cryptographic technologies can be roughly classified into secret-key cryptographic technology and public-key cryptographic technology. Secret-key cryptography is a cryptographic scheme based on a data shuffling algorithm, which enables fast encryption/decryption, but allows secured communication and authenticated communication only between two persons who have a secret key.

For this reason, secret-key cryptography is mainly used to encrypt information which needs to be decrypted in real time upon reception, such as a pay digital broadcast. In this case, a decryption key for the pay digital broadcast is distributed to only broadcast subscribers by using a key distribution system called a conditional access system.

Public-key cryptography is a cryptographic scheme based on a mathematical algorithm, which is slower in encryption/decryption than secret-key cryptography, but has the advantage of allowing secured communication and authenticated communication without requiring key sharing in advance. More specifically, public-key cryptography realizes secured communication by performing cryptographic processing using receiver's public key and allows a given user to perform authentication communication by applying a digital signature using his/her private key.

On network shops and bank and securities company online sites established on the Internet, public-key cryptography is often used to protect customer information such as credit card numbers and addresses from eavesdropping. This is because, an encryption key for encrypting customer information cannot be shared in some cases, and hence secret-key cryptography is unsuitable for such cases.

Typical public-key cryptography includes RSA cryptography and elliptic curve cryptography. RSA cryptography uses, as a basis for security, the difficulty of prime factorization, and uses exponential remainder computation as encryption computation. Elliptic curve cryptography uses, as a basis for security, the difficulty of the discrete logarithm problem on elliptic curves, and uses computation of points on elliptic curves for encryption computation.

With regard to this public-key cryptography, although decryption methods for specific keys (public keys) have been proposed, no general decryption method has been known. Therefore, no serious problem has been found in security so far except for the decryption method using a quantum computer (to be described later).

Other public-key cryptography includes knapsack cryptography and multivariate polynomial type cryptography. Knapsack cryptography uses, as a basis for security, the difficulty of the knapsack problem as an NP problem. Multivariate polynomial type cryptography is constructed by using the theory of field extensions and uses, as a basis for security, the solution problem of simultaneous equations.

With regard to knapsack cryptography, however, decoding methods for most of the implementation forms are known, and hence problems arise in terms of security. With regard to multivariate polynomial type cryptography, a powerful decoding method is known. It is also known that this decoding method can be avoided by increasing the key size. According to multivariate polynomial type cryptography, however, the key size required to avoid the decoding method becomes too large, and hence problems have begun to arise.

On the other hand, if a quantum computer is developed, even an RSA cipher and elliptic curve cipher may be decrypted. A quantum computer is a computer which can execute massively parallel calculations by using a physical phenomenon known as entanglement in the quantum theory on the basis of a principle different from that of current computers. Although a quantum computer is a hypothetical computer whose operation has been checked only at the experimental level so far, research and development have progressed to realize it. In 1994, Shor demonstrated that the use of a quantum computer could enable an algorithm which efficiently solved the prime factorization and discrete logarithm problems. That is, the realization of a quantum computer makes it possible to decrypt an RSA cipher based on prime factorization and an elliptic curve cipher based on the discrete logarithm problem.

Under the circumstances, public-key cryptography has recently been studied, which will remain secure even if a quantum computer is realized. As an example of cryptography which is robust against a quantum computer, quantum public-key cryptography can be presented. See, for example, reference (T. Okamoto, K. Tanaka and S. Uchiyama: "Quantum Public-Key Cryptosystems", Advances in Cryptology—CRYPTO2000, Lecture Notes in Computer Science, vol. 1880, pp. 147-165, Springer-Verlag, 2000.) According to quantum public-key cryptography, a quantum computer is actively used to generate keys that form a robust knapsack cipher which cannot be generated in reality by current computers. Quantum public-key cryptography can therefore create a robust knapsack cipher which cannot be decrypted even by a quantum computer.

Quantum public-key cryptography is, however, a scheme which cannot be used at present because it is impossible for current computers to generate keys for the cryptography. On the other hand, multivariate polynomial type cryptography is currently feasible public-key cryptography, which is regarded to be difficult to decrypt. Multivariate polynomial type cryptography, however, requires a very large key size for security against current computers, and hence its practical application is now in question.

In addition, public-key cryptography requires a larger circuit size and longer processing time than secret-key cryptography. For this reason, public-key cryptography cannot be realized in a low-power environment like that for mobile terminals and the like, or even if realized, requires a long wait time. Demands have therefore arisen for public-key cryptography which can be realized even in a low-power environment.

In general, public-key cryptography finds in advance a problem that is difficult to calculate, e.g., a prime factorization problem or discrete logarithm problem, and is designed to force a person who tries to decrypt a ciphertext without knowing a private key to perform operation equivalent to solving the problem that is difficult to calculate.

Even if, however, a problem that is difficult to calculate is found, it does not mean that public-key cryptography whose security is based on the problem can be easily created. This is because, using an excessively difficult problem as a basis for security makes a problem of generating a key difficult, resulting in incapability of generating a key. On the other hand, if a problem is made easier to the extent that a key can be generated, decryption is also made easier.

In order to create public-key cryptography, therefore, it is necessary to find a problem that is difficult to calculate and to convert the problem so as to achieve a delicate balance between making it easy to the extent that a key can be generated and not making it easy to the extent that any person can perform decryption without knowing a private key. Such a conversion of the problem demands high creativity. In practice, since it is very difficult to change such a problem, only a few kind of public-key cryptography have been proposed until now.

As described above, it is required for public-key cryptography to be difficult to solve even by a quantum computer and be realized even by current computers. In addition, public-key cryptography is required to be realized even in a low-power environment.

BRIEF SUMMARY OF THE INVENTION

It is an object of the present invention to provide an encryption apparatus, decryption apparatus, key generation apparatus, program, and method which can create a public-key cryptographic scheme which can ensure security even with the advent of a quantum computer, can be securely realized even by current computers, and can be realized in a low-power environment.

According to a first aspect of the present invention, there is provided an encryption apparatus for encrypting a message $\underline{m}$ on the basis of a fibration $X(x, y, t)=0$ of an algebraic surface X which is a public key, the public key corresponding to private keys, the private keys for decryption being two or more sections corresponding to the fibration $X(x, y, t)$ of the algebraic surface X, the encryption apparatus comprising: a plaintext embedding device configured to embed the message $\underline{m}$ as coefficients of a plaintext polynomial m(t) with a degree not higher than a degree (r−1); a first polynomial generation device configured to generate random polynomials p(x, y, t) and q(x, y, t) each having three variables $\underline{x}$, $\underline{y}$, and $\underline{t}$; a second polynomial generation device configured to generate a random 1-variable irreducible polynomial f(t) with a degree not lower than a degree $\underline{r}$; and a ciphertext generation device configured to generate ciphertext $F=E_{pk}(m, p, q, f, X)$ from the plaintext polynomial m(t) by encryption processing of performing computation including at least one of addition, subtraction, and multiplication of the polynomials p(x, y, t), q(x, y, t), and f(t) and the defining equation X(x, y, t) with respect to the plaintext polynomial m(t).

According to a second aspect of the present invention, there is provided an encryption apparatus for encrypting a message $\underline{m}$ on the basis of a fibration $X(x, y, t)=0$ of an algebraic surface X which is a public key, the public key corresponding to a private key, the private key for decryption being one section corresponding to the fibration $X(x, y, t)$ of the algebraic surface X, the encryption apparatus comprising: a plaintext embedding device configured to embed the message $\underline{m}$ as coefficients of a plaintext polynomial m(t) with a degree not higher than a degree (r−1); a polynomial generation device configured to generate two pairs of random polynomials $q_1(x, y, t)$ and $q_2(x, y, t)$, and $p_1(x, y, t)$ and $p_2(x, y, t)$ each having three variables $\underline{x}$, $\underline{y}$, and $\underline{t}$; a 1-variable irreducible polynomial generation device configured to generate a random 1-variable irreducible polynomial f(t) with a degree not lower than a degree $\underline{r}$; and a ciphertext generation device configured to generate a plurality of ciphertexts $F_1=E_{pk}(m, p_1, q_1, f, X)$ and $F_2=E_{pk}(m, p_2, q_2, f, X)$ from the plaintext polynomial m(t) by encryption processing of performing computation including at least one of addition, subtraction, and multiplication of the 1-variable irreducible polynomial f(t), the two pairs of polynomials $q_1(x, y, t)$ and $q_2(x, y, t)$, and $p_1(x, y, t)$ and $p_2(x, y, t)$, and the fibration $X(x, y, t)$ of the algebraic surface X which is opened to the public.

According to a third aspect of the present invention, there is provided a decryption apparatus for decrypting a message $\underline{m}$ from a ciphertext $F=E_{pk}(m, p, q, f, X)$ on the basis of two sections $D_1$ and $D_2$ which are private keys to be held in advance and correspond to a fibration $X(x, y, t)=0$ of an algebraic surface X, in inputting the ciphertext F which is generated from a plaintext polynomial m(t) in which the message $\underline{m}$ is embedded as coefficients of a plaintext polynomial m(t) with one variable $\underline{t}$ and a degree not higher than a degree (r−1) by encryption processing of performing computation including at least one of addition, subtraction, and multiplication of random polynomials p(x, y, t) and q(x, y, t) each having three variables $\underline{x}$, $\underline{y}$, and $\underline{t}$, a 1-variable irreducible polynomial f(t) with a degree not lower than a degree $\underline{r}$, and the fibration $X(x, y, t)$ of the algebraic surface X which is a public key with respect to the plaintext polynomial m(t), the decryption apparatus comprising: a section substituting device configured to substitute the sections $D_1$ and $D_2$ into the input ciphertext F to generate two 1-variable polynomials $h_1(t)$ and $h_2(t)$; a polynomial subtraction device configured to subtract the 1-variable polynomials $h_1(t)$ and $h_2(t)$ from each other to obtain a subtraction result $\{h_1(t)-h_2(t)\}$; a factorization device configured to factorize the subtraction result $\{h_1(t)-h_2(t)\}$; a polynomial extraction device configured to extract an irreducible polynomial f(t) having a highest degree from the factorization result; and a remainder computing device configured to compute a remainder by dividing the 1-variable polynomial $h_1(t)$ by the irreducible polynomial f(t) to obtain a plaintext polynomial m(t) as the remainder.

According to a fourth aspect of the present invention, there is provided a decryption apparatus for decrypting a message $\underline{m}$ from a plurality of ciphertexts $F_1=E_{pk}(m, p_1, q_1, f, X)$ and $F_2=E_{pk}(m, p_2, q_2, f, X)$ on the basis of one section D which is private keys to be held in advance and corresponds to a fibration $X(x, y, t)=0$ of an algebraic surface X, in inputting the ciphertexts $F_1$ and $F_2$ which are generated from a plaintext polynomial m(t) in which the message $\underline{m}$ is embedded as coefficients of a plaintext polynomial m(t) with one variable $\underline{t}$ and a degree not higher than a degree (r−1) by encryption processing of performing computation including at least one of addition, subtraction, and multiplication of a random 1-variable irreducible polynomial f(t) with a degree not lower than a degree $\underline{r}$, two pairs of random polynomials $q_1(x, y, t)$ and $q_2(x, y, t)$, and $p_1(x, y, t)$ and $p_2(x, Y, t)$ at least one pair of which are different from each other, and the fibration $X(x, y, t)$ of the algebraic surface X which is opened to the public with respect to the plaintext polynomial m(t), the decryption apparatus comprising: a section substituting device configured to substitute the section D into the two input ciphertexts $F_1$ and $F_2$ to generate two 1-variable polynomials $h_1(t)$ and $h_2(t)$; a polynomial subtraction device configured to subtract the 1-variable polynomials $h_1(t)$ and $h_2(t)$ from each other to obtain a subtraction result $\{h_1(t)-h_2(t)\}$; a factorization device configured to factorize the subtraction result $\{h_1(t)-h_2(t)\}$; a polynomial extraction device configured to extract an irreducible polynomial $f(t)$ having a highest degree from the factorization result; and a remainder computing device configured to compute a remainder by dividing the 1-variable polynomial $h_1(t)$ by the irreducible polynomial $f(t)$ to obtain a plaintext polynomial $m(t)$ as the remainder.

According to a fifth aspect of the present invention, there is provided a key generation apparatus for generating a fibration $X(x, y, t)$ of an algebraic surface X which is a public key for encrypting a message $\underline{m}$ and two sections $D_1$ and $D_2$ which are private keys for decrypting the encrypted message $\underline{m}$ and correspond to the fibration $X(x, y, t)=0$ of the algebraic surface X, the key generation apparatus comprising: a first polynomial generation device configured to generate a random 1-variable polynomial $\lambda_x(t)$; a second plaintext generation device configured to generate a 1-variable polynomial $\lambda_y(t)$ which is divisible by the 1-variable polynomial $\lambda_x(t)$; a third polynomial generation device configured to generate two 1-variable polynomials $u_x(t)$ and $v_x(t)$ each indicating a variable $\underline{x}$ with a parameter $\underline{t}$ on the basis of the 1-variable polynomial $\lambda_x(t)$ so as to make a difference $\{u_x(t)-v_x(t)\}$ between the two 1-variable polynomials become equal to $\lambda_x(t)$; a fourth polynomial generation device configured to generate two 1-variable polynomials $u_y(t)$ and $v_y(t)$ each indicating a variable $\underline{y}$ with a parameter $\underline{t}$ on the basis of the 1-variable polynomial $\lambda_y(t)$ so as to make a difference $\{u_y(t)-v_y(t)\}$ between the two 1-variable polynomials become equal to $\lambda_y(t)$; a section generation device configured to generate the two sections $D_1: (x, y, t)=(u_x(t), u_y(t), t)$ and $D_2: (x, y, t)=(v_x(t), v_y(t), t)$ on the basis of the 1-variable polynomials $u_x(t)$, $v_x(t)$, $u_y(t)$, and $v_y(t)$; and a fibration generation device configured to generate a fibration $X(x, y, t)$ of the algebraic surface X which has the sections $D_1$ and $D_2$.

According to a sixth aspect of the present invention, there is provided a key generation apparatus for generating a fibration $X(x, y, t)$ of an algebraic surface X which is a public key for encrypting a message $\underline{m}$ and a section D which is a private key for decrypting the encrypted message $\underline{m}$ and corresponds to the fibration $X(x, y, t)=0$ of the algebraic surface X, the key generation apparatus comprising: a polynomial generation device configured to generate a random 1-variable polynomial $\xi_i(t)$ (where $\underline{i}$ is a natural number); a polynomial generation device configured to generate two 1-variable polynomials $u_x(t)$ and $u_y(t)$ which indicate variables $\underline{x}$ an $\underline{y}$ of the algebraic surface with a parameter $\underline{t}$; a section generation device configured to generate the section $D: (x, y, t)=(u_x(t), u_y(t), t)$ on the basis of the 1-variable polynomials $u_x(t)$ and $u_y(t)$; and a fibration generation device configured to generate a fibration $X(x, y, t)$ of the algebraic surface X which has the section D on the basis of the 1-variable polynomials $\xi_i(t)$ and the section D.

According to each of the first to sixth aspects, an encryption apparatus, decryption apparatus, and key generation apparatus based on a public-key cryptographic scheme which is designed to use, as a private key, a section of algebraic curves (divisors) on a fibration $X(x, y, t)$ of an algebraic surface X, and uses, as a basis for security, a divisor finding problem of obtaining divisors on an algebraic surface which is a difficult problem which has not been solved even by contemporary mathematics. This makes it possible to create a public-key cryptographic scheme which can ensure security even in the advent of a quantum computer, can be securely realized by current computers, and can be realized in a low-power environment.

DETAILED DESCRIPTION OF THE INVENTION

Figure 1:
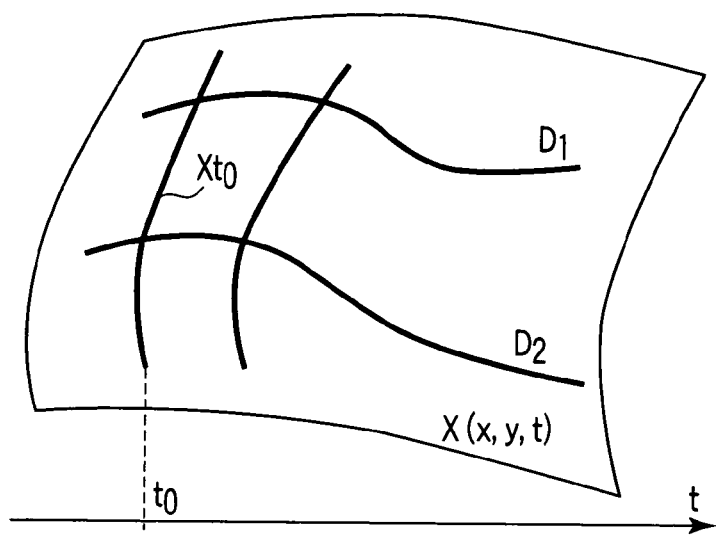
FIG. 1 is a schematic view for explaining an algebraic surface in each embodiment of the present invention.

Each embodiment of the present invention will be described with reference to the views of the accompanying drawing.

First Embodiment

An algebraic surface to be described in each embodiment is defined as a set of solutions to simultaneous (algebraic) equations defined over a field K and which have two-dimensional degrees of freedom. For example, simultaneous equations (1) over the field K include, for five variables, three equations which bind the respective variables, and have two-dimensional degrees of freedom, and hence can be regarded as an algebraic surface:

$$f_1(x, y, z, v, w)=0,$$

$$f_2(x, y, z, v, w)=0,$$

$$f_3(x, y, z, v, w)=0 \quad (1)$$

As indicated by equation (2), in particular, a space defined as a set of solutions of a single algebraic equation over the field K with three variables becomes an algebraic surface over the field K.

$$f(x, y, z)=0 \quad (2)$$

Equations (1) and (2) are defining equations of algebraic surfaces in affine spaces. The defining equation of an algebraic surface in a projective space is f(x, y, z, w)=0 in the case of equation (2).

In this embodiment, however, since an algebraic surface is not handled in a projective space, the defining equation of an algebraic surface is given as equation (1) or equation (2). Even if the defining equation of an algebraic surface is expressed in a projective space, the present invention can be effected without any change.

An algebraic curve is that a solution of a set of solutions of simultaneous (algebraic) equations defined over the field K which has a one-dimensional degree of freedom, and is defined by, for example:

$$g(x, y)=0$$

In this embodiment, since only algebraic surfaces each of which can be expressed by one equation like equation (2) are handled, equation (2) is handled as if it were the defining equation of an algebraic surface.

A field is a set of numbers which can be freely added, subtracted, multiplied, and divided. The set of real numbers, rational numbers, or complex numbers forms a field, but a set like the set of integers or matrices that contains an element, other than zero, which cannot be divided by any element is not a field. Some field is comprised of a finite number of elements and is called a finite field. With regard to a prime p, a residue class Z/pZ of modulo p is a field. Such a field is called a prime field and represented by Fp or the like. In addition, finite fields include a field Fq(q=p^r) having elements equal in number to the power of a prime. In this embodiment, for the sake of simplicity, only prime fields Fp are handled. In general, p of the prime field Fp is called the characteristic of the prime field Fp.

The present invention can also be effected with general finite fields by obvious modifications. In public-key cryptography, a message is often created on a finite field because the message needs to be embedded as digital data. In this embodiment as well, an algebraic surface defined over the finite field (prime field in particular) Fp is handled.

On an algebraic surface X: f(x, y, z)=0, a plurality of algebraic curves generally exist. Such algebraic curves are called divisors on the algebraic surface.

In general, a problem of obtaining (non-trivial) divisors when the defining equation of an algebraic surface is given is a difficult problem which has not been solved by contemporary mathematics, and there is no general solution method known, except for a primitive method like the round robin method. It is known that an algebraic surface defined over a finite field like that handled in this embodiment, in particular, provides fewer clues than that defined over an infinite field (a field comprised of an infinite number of elements) such as a rational number field, and hence the above problem is more difficult.

In this embodiment, this problem will be referred to as a divisor finding problem on an algebraic surface or simply a divisor finding problem, and public-key cryptography whose security is based on the divisor finding problem on an algebraic surface is created.

In the defining equation f(x, y, z)=0 of the algebraic surface X, the variable z is changed to t to set $$g_t(x, y):=f(x, y, t)$$

When this equation is considered as a polynomial over the function field K(t) of one variable with coefficients in a field K, and $g_t(x, y)=0$ defines an algebraic curve over K(t), X is said to have a fibration on an affine straight line $A^1$ with t as a parameter. In addition, f(x, y, t)=0 is called a fibration of the algebraic surface X and is expressed as $X_t$ or the like. Note that in the following description, for the sake of simplicity, if it is obvious that the above function is a fibration, it will be simply expressed as X.

On an algebraic surface having a fibration, there exists an algebraic curve called a section on X that is parameterized by t as $$(x, y, t)=(u_x(t), u_y(t), t)$$

As shown in FIG. 1, an algebraic curve obtained by substituting an element $t_0$ of the field K into the parameter t is called a fiber and represented by $Xt_0$. Both the fiber and the section are divisors of the algebraic surface $X_t$.

In general, when a fibration of an algebraic surface is provided, a corresponding fiber is immediately obtained by substituting an element of the field into t, but it is extremely difficult to obtain a corresponding section. That is, a fiber can be said to be a trivial divisor, and a section can be said to be a non-trivial divisor.

Public-key cryptography described in the present invention is public-key cryptography whose security is based on the problem of finding sections on X when a fibration $X_t$ of the algebraic surface X is provided.

As a method of obtaining a section from a fibration, the following is the only method known even in contemporary mathematics, which includes procedures (i) to (iv) described below:

(i) Assuming that a section ($u_x(t)$, $u_y(t)$, t) satisfies deg $u_x(t) < r_x$ and deg $u_y(t) < r_y$, the following are set:

$$u_x(t)=\alpha_0+\alpha_1 t+ \ldots +\alpha_{r_x-1}t^{r_x-1}$$

$$u_y(t)=\beta_0+\beta_1 t+ \ldots +\beta_{r_y-1}t^{r_y-1}$$

(ii) These polynomials $u_x(t)$ and $u_y(t)$ are substituted into $$X(x, y, t) = \sum_{(i,j,k) \in I} \eta_{i,j,k} x^i y^j t^k = 0$$

to obtain $$X(u_x(t), u_y(t), t) = \sum_{(i,j,k) \in I} \eta_{i,j,k} u_x(t)^i u_y(t)^j t^k = : \sum_i c_i t^i$$

(iii) By setting $r=\max\{i \deg u_x(t)+j \deg u_y(t)+k|(i, j, k)\in I\}$, the following equation system is set up:

$$\begin{cases} c_0(\alpha_0, \ldots, \alpha_{r_x-1}, \beta_0, \ldots, \beta_{r_y-1}) = 0 \\ c_1(\alpha_1, \ldots, \alpha_{r_x-1}, \beta_0, \ldots, \beta_{r_y-1}) = 0 \\ \phantom{c_1(\alpha_1, \ldots, \alpha_{r_x-1}, \beta_0, \ldots,} \ldots \\ c_r(\alpha_r, \ldots, \alpha_{r_x-1}, \beta_0, \ldots, \beta_{r_y-1}) = 0 \end{cases} \quad (5)$$

(iv) The section is obtained by solving the system of equations in procedure (iii) described above.

That is, public-key cryptography according to the present invention also resolves itself to the problem of solving simultaneous equations as in the case of multivariate polynomial type cryptography described earlier in BACKGROUND OF THE INVENTION. However, multivariate polynomial type cryptography is dependent on the theory of finite field extensions which has been elucidated to a considerable extent by contemporary mathematics, whereas algebraic surface cryptography is dependent on the divisor finding problem which is an unsolved mathematical problem. That is, the problem on which algebraic surface cryptography of the present invention is dependent is considerably difficult as compared with the problem on which multivariate polynomial type cryptography is dependent.

Two specific embodiments of public-key cryptography based on the divisor finding problem on an algebraic surface will be described below.

First Embodiment

This embodiment uses the following four public keys:
1. the characteristic p of a prime field;
2. a fibration: $X(x, y, t)=0$ of an algebraic surface X on Fp;
3. a lowest degree r for a 1-variable irreducible polynomial f(t) on Fp, with r being set to be larger than the highest degree of t of X(x, y, t); and
4. a highest degree d of polynomials $u_x(t)$, $u_y(t)$, $v_x(t)$, and $v_y(t)$ in sections (as private keys).

Private keys are two different sections $D_1$ and $D_2$ given below:
1. a section of an algebraic surface X over Fp: $D_1$: (x, y, t)=$(u_x(t), u_y(t), t)$
2. a section of the algebraic surface X over Fp: $D_2$: (x, y, t)=$(v_x(t), v_y(t), t)$ These values can be easily obtained by a key generation method described later.

An outline of encryption processing will be described next. A message to be encrypted (to be referred to as a plaintext hereinafter) m is divided into blocks like $m=m_0\|m_1\|\ldots\|m_{r-1}$, and are embedded in a plaintext polynomial m(t) (plaintext embedding processing).

$$m(t)=m_{r-1}t^{r-1}+\ldots+m_1t+m_0$$

In this case, in order to convert the plaintext polynomial m(t) into a polynomial on Fp, each value $m_i$ ($0\leq i\leq r-1$) must be set to become an element of Fp. That is, the plaintext is divided on the basis of the bit length to satisfy $0\leq m_i\leq p-1$.

Random polynomials p(x, y, t) and q(x, y, t) on Fp are randomly determined. At this time, p(x, y, t) needs to be determined so as to satisfy the following two conditions.

Letting $e_x$, $e_y$, and $e_t$ be the exponents in x, y, and t of the respective terms, p(x, y, t) is determined within the range in which inequality (3) given below is satisfied.

$$(e_x+e_y)d+e_t<r \quad (3)$$

This is the condition for uniquely determining a plaintext in decryption processing (to be described later). Letting $\deg_x$, $\deg_y$, and $\deg_t$ be degrees with respect to x, y, and t of the polynomial, $$dx:=\deg_x X(x, y, t),$$

$$dy:=\deg_y X(x, y, t)$$

then, to meet the demand for security (to be described later), p(x, y, t) is determined so as to satisfy:

p(x,y,t) contains term $x^{e_x}y^{e_y}$ satisfying $e_x>d_x$ and $e_y>y$. (4)

In addition, in order to meet the demand for security (to be described later), f(t) also needs to be determined so as to satisfy $$r>\deg_t X(x, y, t) \quad (5)$$

Furthermore, a random 1-variable rth-degree irreducible polynomial f(t) on Fp is determined. An irreducible polynomial is a polynomial that cannot be factorized any more. It is known that it is very easy to determine whether or not a 1-variable polynomial on a finite field is irreducible. A ciphertext F(x, y, t) is calculated from polynomials m(t), p(x, y, t), q(x, y, t), and f(t) given above and the fibration X(x, y, t) of the algebraic surface X as a public key according to equation (6):

$$F(x, y, t)=m(t)+f(t)p(x, y, t)+X(x, y, t)q(x, y, t) \quad (6)$$

As will be described later in <Discussion on Security>, lacking of even one of random polynomials p(x, y, t), q(x, y, t), and f(t) given above will raise a problem in terms of security. That is, the calculation formula for the ciphertext F(x, y, t) is an expression exhibiting inevitability.

The receiver who has received the ciphertext F(x, y, t) performs decryption by using the owned private keys $D_1$ and $D_2$ in the following manner. First of all, the sections $D_1$ and $D_2$ are substituted into the ciphertext F(x, y, t). In this case, the sections $D_1$ and $D_2$ are substituted into the algebraic surface X(x, y, t). As is obvious from the relationship represented by $$X(u_x(t), u_y(t), t)=0, X(v_x(t), v_y(t), t)=0$$

two expressions $h_1(t)$ and $h_2(t)$ having the following relationship can be obtained.

$$h_1(t) = F(u_x(t), u_y(t), t)$$
$$\phantom{h_1(t)} = m(t) + f(t)p(u_x(t), u_y(t), t)$$
$$h_2(t) = F(v_x(t), v_y(t), t)$$
$$\phantom{h_2(t)} = m(t) + f(t)p(v_x(t), v_y(t), t)$$

The sides of the two expressions are subtracted from each other to calculate $$h_1(t)-h_2(t)=f(t)\{p(u_x(t), u_y(t), t)-p(v_x(t), v_y(t), t)\} \quad (7)$$

Subsequently, $h_1(t)-h_2(t)$ is factorized, and a factor having the highest degree is determined to be f(t). In this case, in order to make the factor having the highest degree be f(t), letting r be the degree of f(t), it suffices to select p(x, y, t) which satisfies inequality (8):

$$\deg(p(u_x(t), u_y(t), t)-p(v_x(t), v_y(t), t))<r \quad (8)$$

For this purpose, it is necessary to select p(x, y, t) so as to satisfy two inequalities (9):

$$\deg(p(u_x(t), u_y(t), t))<r,$$

$$\deg(p(v_x(t), v_y(t), t))<r \quad (9)$$

Since the sections are concealed from the sender, the degree $r$ is set to be sufficiently large, and a maximum value $d$ of the degrees of polynomials $u_x(t)$, $u_y(t)$, $v_x(t)$, and $v_y(t)$ which are the coordinates of the respective sections is opened to the public as a public key. That is, when $p(x, y, t)$ is to be determined, the exponents $e_x$, $e_y$, and $et$ of each term $Cx^{e_x} y^{e_y} t^{et}$ must satisfy inequality (3). Note that $h_1(t)$–$h_2(t)$ can be factorized within a sufficiently effective time because a 1-variable polynomial can be easily factorized. Taking notice that when $h_1(t)$ is divided by $f(t)$ obtained above, the degree of $m(t)$ is less than the degree $r$, the relationship represented by the following equation can be obtained, and a plaintext polynomial $m(t)$ can be obtained.

$$h_1(t) = m(t) + f(t)p(u_x(t), u_y(t), t)$$

A plaintext $m$ can be obtained from the plaintext polynomial $m(t)$ by processing reverse to the plaintext embedding processing. It should be noted that $m(t)$ is unique as a remainder. If this is not unique, a plurality of candidates for the plaintext polynomial $m(t)$ exist, and it becomes difficult to specify a true plaintext polynomial. The reason why $m(t)$ is unique is that since, as in the case of integers, a division algorithm holds for a 1-variable polynomial ring $F[t]$ containing $h_1(t)$, the quotient and remainder obtained by dividing a 1-variable polynomial by a 1-variable polynomial become unique. The division algorithm in a polynomial ring is proved in the following reference:

Kazuo Matsuzaka, Theorem 8 in "Introduction to Algebraic Systems", Iwanami Shoten, 1976, p. 140; the entire contents of which are incorporated herein by reference.

On the other hand, it is known that the division algorithm generally does not hold for polynomials in two or more variables. See, for example, the following reference:

D. Cox, et al., "Ideals, Varieties, and Algorithms", Springer-Verlag; the entire contents of which are incorporated herein by reference.

Lastly, a key generation method in this embodiment will be described. Key generation is performed by randomly selecting sections $D_1$ and $D_2$ and calculating a fibration possessing the selected sections $D_1$ and $D_2$. Note, however, that since the generated algebraic surface has two sections at once, the following contrivance is required.

For the sake of simplicity, the key generation method will be described by taking an elliptic surface $E_t$ as an example of algebraic surfaces. The elliptic surface $E_t$ can be defined as an algebraic surface having a fibration given by $$E_t: y^2 + y = x^3 + a(t)x + b(t)$$

where $a(t)$ and $b(t)$ are 1-variable polynomials. First of all, the characteristic $p$ of the prime field is determined. It is noted that, even if $p$ is small, no problem arises in terms of security. The sections $D_1$ and $D_2$ are expressed as $$D_1: (x, y, t) = (u_x(t), u_y(t), t),$$

$$D_2: (x, y, t) = (v_x(t), v_y(t), t)$$

and are substituted in the elliptic surface $E_t$. This substitution yields $$u_y(t)^2 + u_y(t) = u_x(t)^3 + a(t)u_x(t) + b(t),$$

$$v_y(t)^2 + v_y(t) = v_x(t)^3 + a(t)v_x(t) + b(t)$$

When the sides of these equations are subtracted from each other, $b(t)$ is eliminated to yield $$u_y(t)^2 - v_y(t)^2 - (u_y(t) - v_y(t)) - (u_x(t)^3 - v_x(t)^3) = a(t)(u_x(t) - v_x(t))$$

In order to convert $a(t)$ into a polynomial, it suffices to satisfy $$u_x(t) - v_x(t) | u_y(t) - v_y(t)$$

By using this, key generation can be executed according to the following algorithm. Here, $k_1(t)|k_2(t)$ indicates that a polynomial $k_2(t)$ is divisible by a polynomial $k_1(t)$. First of all, two polynomials exhibiting $\lambda_x(t)|\lambda_y(t)$ are randomly selected. More specifically, a pair of such polynomials can be obtained by, for example, obtaining $\lambda_y(t)$ by calculating $\lambda_y(t) = c(t)\lambda_x(t)$ from two random polynomials $\lambda_x(t)$ and $c(t)$. A polynomial $v_x(t)$ is then randomly selected, and $u_x(t)$ is calculated by $$u_x(t) - v_x(t) = \lambda_x(t)$$

Likewise, a polynomial $v_y(t)$ is randomly selected, and $u_y(t)$ is calculated by $$u_y(t) - v_y(t) = \lambda_y(t)$$

A polynomial $a(t)$ can be calculated by calculating equation (10) using $u_x(t)$, $v_x(t)$, $u_y(t)$, and $v_y(t)$ obtained in the above manner.

$$a(t) = \{u_y(t)^2 - v_y(t)^2 - (u_y(t) - v_y(t)) - (u_x(t)^3 - v_x(t)^3)\}/(u_x(t) - v_x(t)) \quad (10)$$

In addition, $b(t)$ can be obtained by equation (11) using $a(t)$.

$$b(t) = u_y(t)^2 + u_y(t) - u_x(t)^3 - a(t)u_x(t) \quad (11)$$

A key generation method can be implemented by using algebraic surfaces other than elliptic surfaces, if, for example, a defining equation like $y^2 + y = x^5 + a(t) + b(t)$ is chosen, and hence is not limited to elliptic surfaces. However, the key generation method described in this embodiment cannot be applied to, for example, an algebraic surface containing the xy term. For such an algebraic surface, a key generation method described in the second embodiment is effective.

Note, however, that as described later in <Discussion on Security>, a condition X like that described below is required for the shape of the equation of an algebraic surface.

When the fibration $X(x, y, t)$ of the algebraic surface X is viewed as a 2-variable polynomial in $x$ and $y$ (that is, when $t$ is regarded as a constant), it is required that the equation contains a degree-one term $c_1(t)x$ in $x$ and a degree-one term $c_2(t)y$ in $y$, and there is no special relation like $c_1(t) = c_2(t)$ between $c_1(t)$ and $c_2(t)$ . . . (condition X)

In key generation processing according to the present invention, therefore, an equation that satisfies the condition X is assumed for an algebraic surface. Note that all algebraic surfaces exemplified in this embodiment satisfy the condition X.

Lastly, a method of obtaining $d$ and $r$ will be described. It is known that $d$ and $r$ must satisfy inequality (3) according to the decryption method. Since the two sections have already been obtained in the key generation method, $d$ is determined as the maximum value of the degrees of $u_x(t)$, $v_x(t)$, $u_y(t)$, and $v_y(t)$. In addition, $r$ is set to satisfy inequality (5) with the $t$ degree $d_t$ of the algebraic surface $X(x, y, t)$, and is further corrected to satisfy inequalities (4) and (3) with $x$ and $y$ degrees $d_x$ and $d_y$ of $X(x, y, t)$. The lower limit of such values may be set to $r$. For example, $r$ may be selected like $$r = (d_x + 1 + d_y + 1)d + d_t$$

<Discussion on Security>

Consider the security of public-key cryptography according to the present invention which has the above arrangement. Public-key cryptography of the present invention uses, as a basis for security, the difficulty of the problem of finding a section of a fibration $X_t$ of an algebraic surface when it is provided. When an algebraic surface is regarded as an algebraic curve over a 1-variable algebraic function field K(t), a section can be regarded as a K(t) rational point on an algebraic curve. This will be described in detail below by taking an elliptic surface $y^2+y=x^3+a(t)+b(t)$ as an example. A 1-variable algebraic function field is defined as $$K(t)=\{f(t)/g(t)|f(t)\in K[t], g(t)\in K[t]-\{0\}\}$$

and is a set of polynomials with K coefficient as denominators and numerators. This set becomes a field. That is, when elliptic curve $y^2+y=x^3+ax+b$ defined over the field K is defined over the 1-variable algebraic function field K(t), an elliptic surface is obtained. In contrast, therefore, when an elliptic surface is regarded as an elliptic curve defined over K(t), since the respective coordinates $\underline{x}$, $\underline{y}$, and $\underline{t}$ of the section are elements of the 1-variable algebraic function field K(t), the section itself can be regarded as a point defined over K(t). As described above, that point over K(t) which satisfies the expression of the algebraic surface (the elliptic surface in this case) is defined as the K(t) rational point. As discussed above, when an algebraic surface is regarded as an algebraic curve over the 1-variable algebraic function field K(t), the section can be regarded as the K(t) rational point on the algebraic curve. Note that points on K which satisfy the expression of the corresponding algebraic surface (the elliptic surface in this case) are said to be K rational points.

Consider an algebraic surface X having a fibration. If this surface is a projective surface, since an algebraic equivalence or numerical equivalence can be defined on the divisors, curves (irreducible divisors) on X can be essentially classified into sections and fibers. It therefore suffices if these two types of curves are considered as curves on X.

If, however, X represents an affine surface, the shapes of divisors and the equivalence relationships between them considerably differ from those in the case of a projective surface. Therefore, curves other than sections and fibers must also be considered. More specifically, curves with $\underline{x}$ and $\underline{y}$ as parameters must be considered in addition to rational curves (sections) with $\underline{t}$ as a parameter. When this is generally expressed, coordinates (x, y, t) are expressed with a variable $\underline{s}$ like equations (12) as parameterization.

$$x=u_x(s), y=u_y(s), t=u_t(s) \quad (12)$$

In this case, since a hyperplane section which fixes one of $\underline{x}$, $\underline{y}$, and $\underline{t}$ to be constant and its irreducible component can be easily obtained, the divisor finding problem associated with the algebraic surface X in the present invention can be "it is very difficult to obtain a divisor represented by 1-variable parameterization (12) with none of $\underline{x}$, $\underline{y}$, and $\underline{t}$ being a constant". In this case, assuming that this divisor finding problem is difficult, the security of algebraic curve cryptography will be verified.

First of all, when ciphertext $$F(x, y, t)=m(t)+f(t)p(x, y, t)+X(x, y, t)q(x, y, t)$$

is provided, decryption processing is to specify a polynomial m(t). According to the above decryption method, the sections $(u_x(t), u_y(t), t)$ and $(v_x(t), v_y(t), t)$ of X(x, y, t) are substituted in F(x, y, t), and the polynomial is factorized to derive $$f(t)\{p(u_x(t), u_y(t), t)-p(v_x(t), v_y(t), t)\}$$

This factorization operation becomes the point. In contrast, in the following description, unauthorized decryption schemes are classified into three schemes, namely [attack 1] to [attack 3], and it will be verified that decryption cannot be performed by any operations other than the above operation.

[Attack 1] determine m(t) from the shape of expression F(x, y, t).

[Attack 2] extract m(t) by substituting something into the variables $\underline{x}$, $\underline{y}$, and $\underline{t}$ or reducing them.

[Attack 3] obtain m(t) by using differentiation or partial differentiation about the variables $\underline{x}$, $\underline{y}$ and $\underline{t}$.

[Attack 1] Attack Method Determined from Shape of Expression m(t) is a polynomial about $\underline{t}$. If m(t) is the only polynomial which contains $\underline{t}$ in F(x, y, t), m(t) can be specified from the shape of F(x, y, t). As is obvious upon modification like $$F(x, y, t)=\{m(t)+cf(t)\}+f(t)\{p(x, y, t)-c\}+X(x, y, t)q(x, y, t)$$

m(t) is not necessarily a unique polynomial with $\underline{t}$ in F(x, y, t). Even if m(t)+cf(t) is known, m(t) cannot be obtained as long as f(t) is unknown.

[Attack 2] Attack Method by Substitution in Variables or Reduction

Reducing f(x, y, t) with g(x, y, t) is to obtain the remainder when f(x, y, t) is divided by g(x, y, t).

[Attack 2-1] Attack by Substitution of Two-Dimensional Manifold

Since the defining equation X(x, y, t) of a surface is the only information opened to the public, a two-dimensional manifold significant to F(x, y, t) is X(x, y, t) itself. With regard to this, the ciphertext f(x, y, t) may be reduced with X(x, y, t) by using a Gröbner basis or the like. With regard to a 3-variable polynomial, however, since the division algorithm does not generally hold, there is no positive proof that m(t)+f(t)p(x, y, t) can be obtained from F(x, y, t). Even if it can be obtained, m(t) cannot be specified since f(t) is unknown, as described in [Attack 1].

[Attack 2-2] Attack by Substitution of One-Dimensional Manifold

A one-dimensional manifold is a curve. General curves are defined by simultaneous equations. When such simultaneous equations are not associated with F(x, y, t) or X(x, y, t), only the method of reduction using polynomials can be used. As described above, m(t) cannot be specified by an attack using reduction.

Curves closely associated with F(x, y, t) or X(x, y, t) can be classified into the following two types:

(i) a curve fixing one of $\underline{x}$, $\underline{y}$, and $\underline{t}$ to be constant; and (ii) a curve having parameterization (12) without fixing any of $\underline{x}$, $\underline{y}$, and $\underline{t}$ to be constant. Such curves are classified into the following two types:

(a) a curve on the surface X (i.e., an irreducible divisor); and (b) a curve which is not on the surface X.

Four combinations of these cases are conceivable. Note, however, that in the case of (ii) and (a), m(t) cannot be obtained according to the assumption of the divisor finding problem, and hence this combination cannot be used for an attack. Therefore, the remaining three cases will be considered.

Case of (i) and (a)

This is an attack using a fiber or a hyperplane section on X. When $x=x_0$ is fixed, a polynomial $X(x_0, y, t)$ is obtained from the defining equation. Substitution of $x=x_0$ into F(x, y, t) yields $$F(x_0, y, t)=m(t)+f(t)p(x_0, y, t)+X(x_0, y, t)q(x_0, y, t)$$

At this time, if $m(t)+f(t)p(x_0, y, t)$ can be specified by dividing $F(x_0, y, t)$ by $X(x_0, y, t)$, candidates for m(t) and f(t)

can be narrowed down by classifying the terms into terms comprised of only $\underline{t}$ and other terms. In addition, m(t) may be obtained by replacing $x_0$ with $x_1, x_2, x_3, \ldots$. Under conditions (5) and (4), however, with regard to both $\underline{y}$ and $\underline{t}$, the degree of $m(t)+f(t)p(x_0, y, t)$ is higher than that of $X(x_0, y, t)$. Therefore, $m(t)+f(t)p(x_0, y, t)$ cannot be specified, and candidates for m(t) and f(t) cannot be narrowed down.

The same as in the case of $x=x_0$ applies to a case wherein $y=y_0$ is fixed. Under conditions (5) and (4), $m(t)+f(t)p(x, y_0, t)$ cannot be specified as the remainder obtained when $F(x, y_0, t)$ is divided by $X(x, y_0, t)$.

When $t=t_0$ is fixed, a polynomial $X(x, y, t_0)$ is obtained from the defining equation. This is an equation for a fiber. Substitution of $t=t_0$ into the ciphertext $F(x, y, t)$ yields $$F(x, y, t_0) = m(t_0) + f(t_0)p(x, y, t_0) + X(x, y, t_0)q(x, y, t_0)$$

In this case as well, it may be considered to divide $F(x, y, t_0)$ by $X(x, y, t_0)$. Under conditions (5) and (4), however, with regard to both $\underline{x}$ and $\underline{y}$, the degree of $m(t_0)+f(t_0)p(x, y, t_0)$ is higher than that of $X(x, y, t_0)$. Therefore, $m(t_0)+f(t_0)p(x, y, t_0)$ cannot be specified (as in the case wherein $x=x_0$ or $y=y_0$ is fixed). Even if it is specified, since $f(t_0)p(x, y, t_0)$ also contains a constant, the exact value of $m(t_0)$ cannot be determined. Consequently, in this case as well, m(t) cannot be obtained.

Case of (i) and (b)

This is a case wherein one of $\underline{x}$, $\underline{y}$, and $\underline{t}$ is fixed, but an expression that does not satisfy $X(x, y, 0)=0$ is used. In this case, if $x=x_0$ and $x_1$ which satisfy $$X(x_0, y, t) = X(x_1, y, t)$$

are found and $F(x_0, y, t)$ and $F(x_1, y, t)$ are reduced by $X(x_0, y, t)$, it may be considered to obtain m(t) with the same method as in the case of (i) and (a). In this case as well, owing to conditions (5) and (4) associated with degrees, m(t) cannot be obtained for the same reason as in the case of (i) and (a).

Case of (ii) and (b)

This is an attack using curves parametrized by $x=u_x(s)$, $y=u_y(s)$, and $t=u_t(s)$ with one variable $\underline{s}$, although this is not a section of X. In this case, although $X(x, y, t)=0$ is not satisfied, it may be possible to find $(u_x(s), u_y(s), u_t(s))$ and $(v_x(s), v_y(s), v_t(s))$ which satisfy $X(u_x(s), u_y(s), u_t(s))=X(v_x(s), v_y(s), v_t(s))$. Substitution of these expressions into $F(x, y, t)$ yields the following two equations:

$$F(u_x(s), u_y(s), u_t(s)) = m(u_t(s)) + f(u_t(s))p(u_x(s), u_y(s), u_t(s)) + X(u_x(s), u_y(s), u_t(s))q(u_x(s), u_y(s), u_t(s))$$

$$F(v_x(s), v_y(s), v_t(s)) = m(v_t(s)) + f(v_t(t))p(v_x(s), v_y(s), v_t(s)) + X(v_x(s), v_y(s), v_t(s))q(v_x(s), v_y(s), v_t(s))$$

In addition, $u_t(s)=v_t(s)$ can be selected. If the sides of the above two equations are subtracted under this assumption, the term $m(u_t(s))$ is eliminated to obtain $$F(u_x(s), u_y(s), u_t(s)) - F(v_x(s), v_y(s), v_t(s)) = f(u_t(s))\{p(u_x(s), u_y(s), u_t(s)) - p(v_x(s), v_y(s), v_t(s))\} + X(u_x(s), u_y(s), u_t(s))\{q(u_x(s), u_y(s), u_t(s)) - q(v_x(s), v_y(s), u_t(s))\}$$

In this case, there is a conceivable operation of dividing $F(u_x(s), u_y(s), u_t(s)) - F(v_x(s), v_y(s), v_t(s))$ by $X(u_x(s), u_y(s), u_t(s))$. Even with this operation, however, owing to conditions (5) and (4) associated with degrees, there is no positive proof that $f(t(s))\{p((u_x(s), u_y(s), u_t(s)) - P(v_x(s), v_y(s), v_t(s))\}$ can be obtained. In this case, therefore, f(t) and m(t) cannot be obtained.

Here, as described above, in order to derive $$\deg X(u_x(s), u_y(s), u_t(s)) < \deg f(u_t(s))\{p(u_x(s), u_y(s), u_t(s)) - p(v_x(s), v_y(s), v_t(s))\}$$

from conditions (5) and (4), it is necessary to perform subtraction so as not to eliminate higher-degree terms of $\{p(u_x(S), u_y(s), u_t(s)) - p(v_x(s), v_y(s), u_t(s))$ including the highest-degree term of $p(x, y, t)$. In order to leave the highest-degree term, the condition X is required. In practice, letting $x^\alpha y^\beta$ be the highest-degree term of $p(x, y, t)$ with respect to $\underline{x}$ and $\underline{y}$, the highest-degree term is eliminated from $$p(u_x(s), u_y(s), u_t(s)) - p(v_x(s), v_y(s), u_t(s)) \qquad ([2-2]-1)$$

when $$u_x(s)^\alpha u_y(s)^\beta = v_x(s)\alpha v_y(s)^\beta$$

As is obvious when the above equation is modified into $(u_x(s)/v_x(s))^\alpha (u_y(s)/v_y(s))^\beta = 1$, this indicates $$u_x(s) = \zeta v_x(s), u_y(s) = \eta v_y(s)$$

where $\zeta$ and $\eta$ are some roots of 1. In this attack, under the condition that $u_x(s) \neq v_x(s)$ or $u_y(s) \neq v_y(s)$ holds, it is necessary to have $$X(u_x(s), u_y(s), u_t(s)) = X(v_x(s), v_y(s), u_t(s))$$

For this purpose, it is necessary to satisfy $$X(u_x(s), u_y(s), u_t(s)) = X(\zeta v_x(s), \eta v_y(s), u_t(s))$$

According to the condition X, however, since $X(x, y, t)$ contains a term including only $\underline{x}$ and a term including only $\underline{y}$, $\zeta = \eta = 1$ can be derived, and hence $u_x(s) = v_x(s)$ and $u_y(s) = v_y(s)$. This contradicts the precondition for the attack method. Therefore, imposing the condition X on the defining equation of an algebraic surface makes it possible to create a ciphertext so as not to eliminate the highest-degree term in the difference indicated by expression ([2-2]-1).

[Attack 2-3] Attack by Substitution of Zero-dimensional Manifold

A plaintext polynomial is given as follows, with $a_0, a_1, \ldots, a_{r-1}$ being unknowns:

$$m(t) = a_{r-1}x^{r-1} + \ldots + a_1 + a_0$$

It is known that rational points $(x_i, y_i, t_i)$ of the algebraic surface $X(x, y, t) = 0$ as a public key are obtained for any algebraic surfaces relatively easily in large quantity. Substitution of these rational points into the ciphertext $F(x, y, t)$ yields a large quantity of equations like the following equation:

$$F(x_i, y_i, t_i) = m(t_i) + f(t_i)p(x_i, y_i, t_i)$$

It seems that m(t) can be solved by solving these simultaneous equations. However, since f(t) and q(x, y, t) are random polynomials, and q(x, y, t) in particular is a 3-variable polynomial, the number of types of coefficients increases by the order of $O(n^2)$ or more with respect to the degree $\underline{n}$. In consideration of these coefficients as variables, it is necessary to obtain the solutions of simultaneous equations having an enormous number of variables. As the degrees of 3-variable polynomials increase, the level of difficulty easily reaches a level at which solutions cannot be actually obtained. This attack is therefore unrealistic.

Note that when the factor p(x, y, z) is eliminated from the ciphertext, the simultaneous equations are given by $$F(xi, y_i, t_i) = m(t_i) + f(t_i)$$

In this case, the following inequality holds:

$$\deg m(t) < r \leq \deg f(t)$$

If, therefore, deg f(t) and $\underline{r}$ are not so large, coefficients can be obtained relatively easily. Prevention of this attack is the reason for the existence of the factor p(x, y, z). Likewise, if at least one of irreducible polynomials f(t) and p(x, y, t) is eliminated from the ciphertext, this attack produces $$F(x_i, y_i, t_i) = {}^m(t_i)$$

and hence, the plaintext polynomial m(t) is obtained more easily. Preventing this is the reason for the existence of the factors f(t) and p(x, y, t).

[Attack 3] Attack Using Differentiation and Partial Differentiation

In general, a polynomial can be analyzed by using the differentiation or partial differentiation of defining equation X(x, y, t). However, there is provided no means for obtaining a section or no method which is more efficient than the attack method considered above. Therefore, the difficulty of the problem remains unchanged even with the use of differentiation and partial differentiation for the decryption of the ciphertext F(x, y, t).

<Variation>

Lastly, several variations of this embodiment will be described below. The first variation is a scheme of reducing the size of a public key by using $\underline{p}$, $\underline{r}$, and $\underline{t}$ in the public key as fixed parameters. Obviously, there is conceivable a method using this scheme while fixing only some of these parameters. In the first variation, although fixing some of the parameters imposes some restriction on key generation, if $\underline{r}$ and $\underline{d}$ takes sufficiently large values, a desired public key X(x, y, t) can be obtained by several trials.

The second variation is a scheme of keeping $\underline{d}$ of a public key undisclosed. Essentially, $\underline{d}$ is used for a condition for obtaining f(t) as a highest-degree factor from the right side of equation (7) when the right side is obtained as a result of factorization during decryption processing. Essentially, it suffices if f(t) is obtained from equation (7), and there is no need for f(t) to become a highest-degree factor of $h_1(t)-h_2(t)$. Assume that f(t) cannot be uniquely determined. Even in this case, if the remainder based on f(t) of $h_1(t)$ does not coincide with the remainder based on f(t) of $h_2(t)$ upon comparison, f(t) is not correct. Note that the probability that incorrect f(t) is selected and the two remainders coincide with each other is considerably low. Assume that the remainders coincide with each other at this low probability. Even in this case, if a check bit is added to the plaintext in advance, the correct plaintext is specified in most cases. The above arrangement eliminates the necessity of the restriction of $\underline{d}$ and can reduce the public key. In addition, a ciphertext can be reduced by reducing the degree of f(t). Furthermore, the leakage of the degree information of a section can be prevented.

The third variation is a scheme in which encryption equation (6) is modified. For example, even if equation (6) is modified so as to use subtraction as follows, encryption/decryption can be performed in the same manner, and security similar to that described above can be achieved.

$$F(x, y, t) = m(t) - f(t)p(x, y, t) - X(x, y, t)q(x, y, t)$$

It is sufficiently possible that the encryption equation can be modified within the gist of the present invention, and decryption processing can be changed accordingly.

The fourth variation is a scheme of embedding a plaintext $\underline{m}$ into the 1-variable irreducible polynomial f(t). The above embodiment has exemplified the scheme of randomly generating f(t). In this case, since the difficulty in obtaining f(t) without any private key is a feature of public-key cryptography of the present invention, the scheme of also embedding plaintext information into f(t) is feasible. When a plaintext is also embedded into f(t), a larger size of a plaintext can be encrypted at once. Note, however, that since the embedding result f(t) needs to be converted into irreducible polynomials, it is necessary to set specific coefficients to random coefficients in advance. Since very many irreducible polynomials exist, even if a plaintext is embedded in some coefficients, irreducible polynomials can be obtained in most cases. Even if no irreducible polynomial can be obtained, the search range can be extended by increasing the degree of f(t).

The fifth variation is a scheme of adding verification processing for a decryption result to decryption processing. The received ciphertext F(x, y, t) may include a false text which cannot become a ciphertext. For example, such a false text may be received when someone intentionally transmits an authorized ciphertext and when part of a ciphertext is destroyed during transmission. Such an unauthorized ciphertext is removed by the same scheme as in the second variation. Note that the fifth variation differs from the second variation in that decrypted texts are always verified regardless of the number of highest-degree factors. In the second variation, a decrypted text is verified when two or more highest-degree factors exist and f(t) cannot be uniquely determined.

In the sixth variation, a plaintext is not used as a simple message $\underline{m}$, and a unidirectional function such as a hash function $\underline{h}$ is used to establish $$m' = m \| h(m) \qquad \text{(vari 6)}$$

It is then checked whether a decrypted text m' output by decryption processing satisfies equation (vari 6) by using a hash function $\underline{h}$, thereby checking the authenticity of the decrypted text m'. This provides the effect of preventing unauthorized decrypted texts as also described in the fifth variation. That is, when a person tries to generate an unauthorized ciphertext corresponding to a plaintext $m_1$ associated with the plaintext $\underline{m}$ from an authorized ciphertext corresponding to the plaintext $\underline{m}$, the person who tries to tamper cannot obtain the plaintext $m_1$ because he/she cannot decrypt the original ciphertext and does not know the plaintext $\underline{m}$. The hash function $\underline{h}$ has unidirectionality and takes a random value with respect to an input. For this reason, it is very difficult to make a tampered ciphertext have a structure like that represented by $$m_1' = m_1 \| h(m_1)$$

In other words, this variation can be said to be a specific example of the check bit described in the second variation, but has higher security than the check bit. This is because, public-key cryptography including conversion of the plaintext $\underline{m}$ improves security against tampering and can achieve strong security against active attacks. Note that an active attack means a scheme of making a decryption apparatus decrypt an arbitrarily generated ciphertext and decrypting a target ciphertext by using information obtained from the decryption result.

(Specific Arrangement of First Embodiment)

The specific arrangements of the key generation apparatus, encryption apparatus, and decryption apparatus and their algorithms in this public-key cryptography will be described next.

(Key Generation Apparatus and Flow of Processing)

Figure 2:
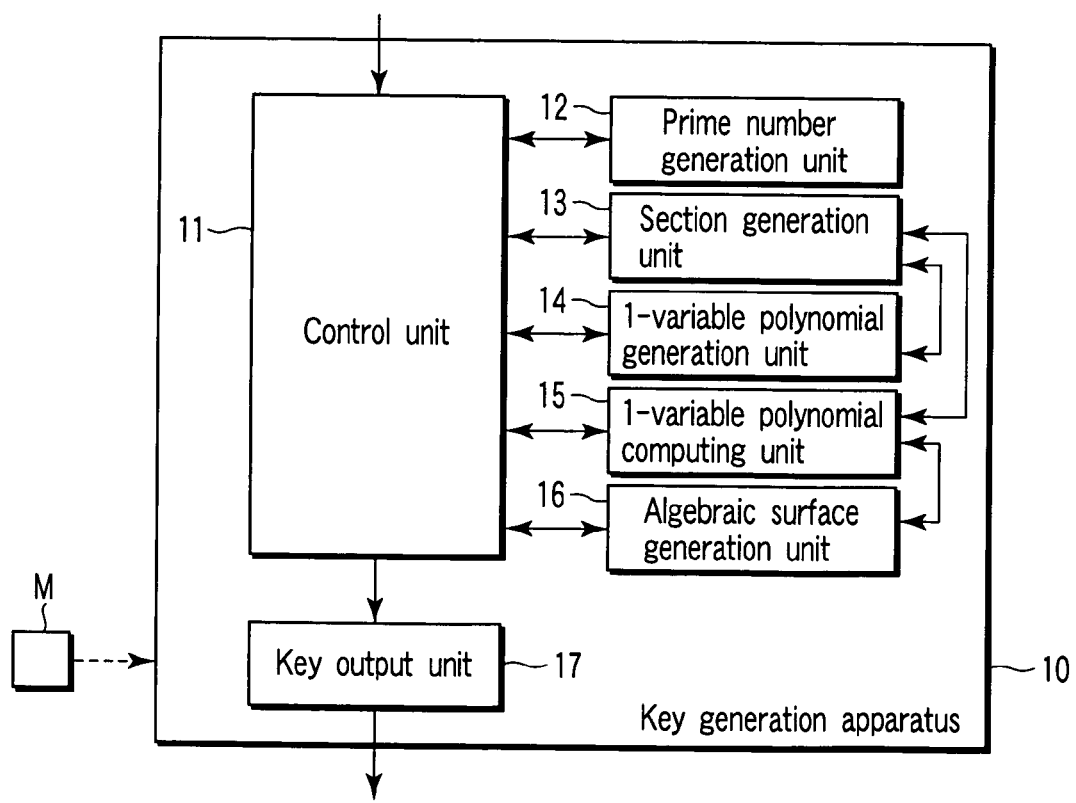
FIG. 2 is a block diagram showing the overall arrangement of a key generation apparatus according to the first embodiment of the present invention.
Figure 3:
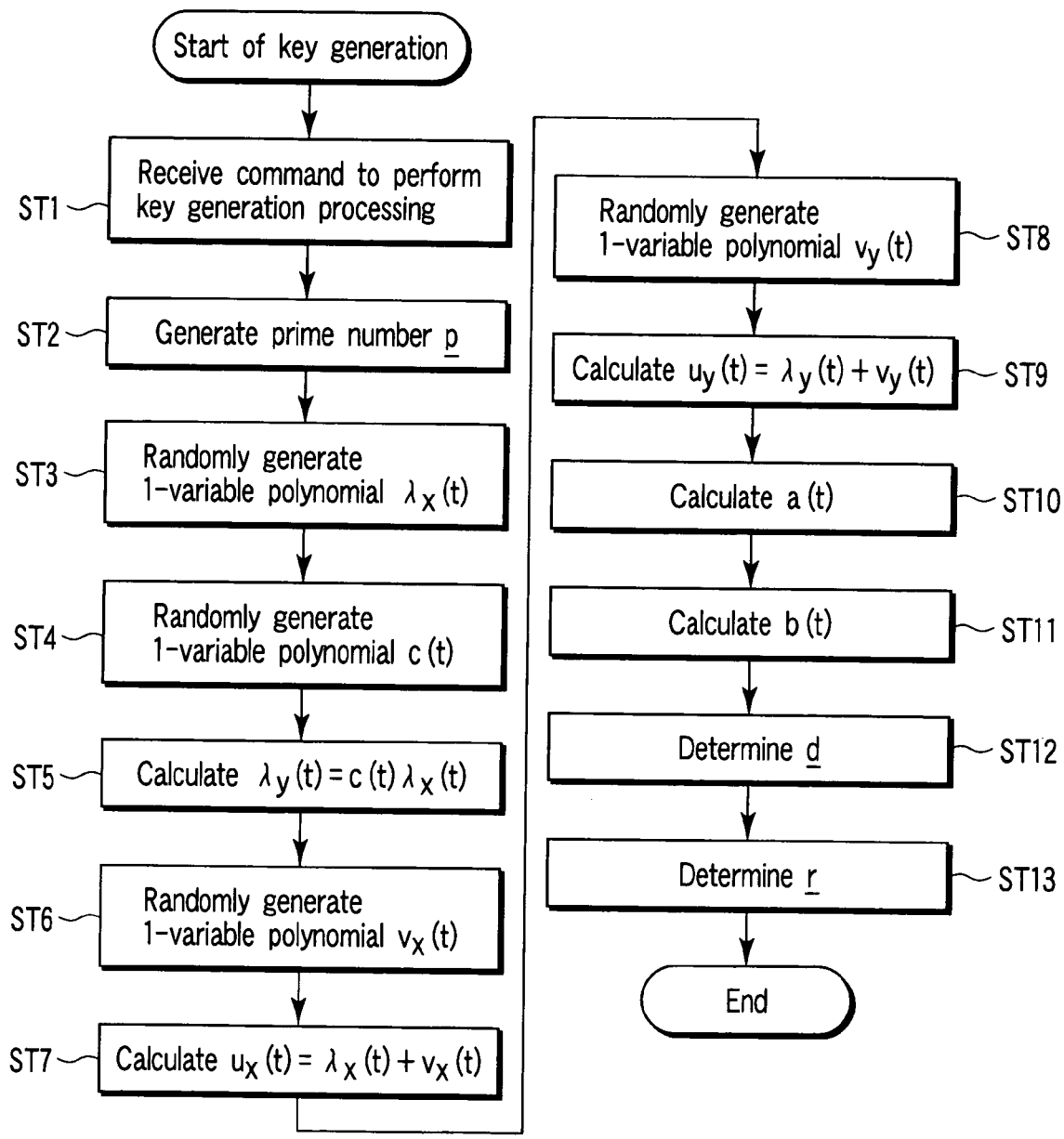
FIG. 3 is a flowchart for explaining the flow of processing in the key generation apparatus according to the first embodiment.

The arrangement of the key generation apparatus and the flow of processing according to this embodiment will be described with reference to the overall arrangement shown in FIG. 2 and the flowchart shown in FIG. 3. In order to assist understanding, specific numerical values and expressions are presented. Note that, however, these numerical values and expressions are merely examples for assisting understanding, and hence do not necessarily coincide with numerical values and expressions, e.g., the degrees of polynomials in particular, which are actually used and have sufficient security.

In addition, the key generation apparatus 10 may be realized by a hardware device such as an IC chip and the like having a tamper proof and may be realized by a combination of hardware device and software. The software has been installed in a computer of the apparatus 10 from a storage media M or the network in advance and the software is composed of a program for realizing the function of the apparatus 10. The example using the software can be also realized in the following each apparatuses as the storage media M is also shown in FIGS. 2, 4, 6, 8, and 10 to be described later.

A key generation apparatus 10 includes a control unit 11, prime number generation unit 12, section generation unit 13, 1-variable polynomial generation unit 14, 1-variable polynomial computing unit 15, algebraic surface generation unit 16, and key output unit 17. The units 12 to 17 are controlled by the control unit 11 so as to execute the operation shown in FIG. 3 as a whole. This operation will be described in detail below.

When a command to start key generation processing is transmitted from an external apparatus or the like to the control unit 11, the key generation apparatus 10 starts the processing. Upon receiving the command (ST1), the control unit 11 requests the prime number generation unit 12 to generate a prime number. As a prime number generation method, a method of randomly generating a prime number may be used. However, there is no need to use a large prime number. In this case, therefore, one of prime numbers each comprised of at most about 6 bits is randomly selected, or arbitrarily selected by means of determining in advance an output order. Alternatively, a predetermined prime number is selected. Assume that in this case, prime number p=17 is selected (ST2).

The control unit 11 transmits the prime number p to the section generation unit 13. The section generation unit 13 starts generating a section. First of all, the section generation unit 13 transmits the prime number p to the 1-variable polynomial generation unit 14 and requests it to generate a 1-variable polynomial, thereby obtaining a 1-variable polynomial $\lambda_x(t)$ $(=-t(t-1))$ (ST3).

In this case, the 1-variable polynomial generation unit 14 randomly selects a degree within a predetermined range, and generates the coefficients of a 1-variable polynomial having the selected degree within the range of 0 to (p−1) as the elements of the prime field Fp.

The control unit 11 causes the 1-variable polynomial generation unit 14 to generate a random 1-variable polynomial $c(t)$ at the same time when generating $\lambda_x(t)$, thereby obtaining $c(t)$ $(=t)$ (ST4). Thereafter, the control unit 11 transmits $c(t)$ and $\lambda_x(t)$ to the 1-variable polynomial computing unit 15. The 1-variable polynomial computing unit 15 calculates $\lambda_y(t)=c(t)\lambda_x(t)$ (ST5), and outputs the obtained polynomial $\lambda_y(t)$ $(=-t^2(t-1))$ to the section generation unit 13.

Upon receiving $\lambda_y(t)$, the control unit 11 causes the 1-variable polynomial generation unit 14 to randomly generate a 1-variable polynomial $v_x(t)$ $(=t^2+1)$ as in the case of generating $\lambda_x(t)$ (ST6). The control unit 11 transmits $\lambda_x(t)$ $(=-t(t-1))$ and $v_x(t)$ $(=t^2+1)$ to the 1-variable polynomial computing unit 15 to obtain $u_x(t)$ $(=\lambda_x(t)+v_x(t)=t+1)$ (ST7). Likewise, the control unit 11 causes the 1-variable polynomial generation unit 14 to generate $v_y(t)$ $(=t^3+1)$ (ST8), and causes the 1-variable polynomial computing unit 15 to calculate $u_y(t)=\lambda_y(t)+v_y(t)=t^2+1)$ (ST9). Thereafter, the control unit 11 sends out the calculation results $u_x(t)$, $u_y(t)$, $v_x(t)$, and $v_y(t)$ to the section generation unit 13. The section generation unit 13 generates the two sections $D_1$ and $D_2$ on the basis of $u_x(t)$, $u_y(t)$, $v_x(t)$, and $v_y(t)$, and sends out the obtained sections $D_1$ and $D_2$ to the control unit 11.

The control unit 11 transmits $u_x(t)$, $u_y(t)$, $v_x(t)$, and $v_y(t)$ to the algebraic surface generation unit 16. The algebraic surface generation unit 16 obtains $a(t)$ by repeatedly using the 1-variable polynomial computing unit 15 according to equation (10) (ST10). In this case, $a(t)=-t^3+11t^2-3t-3$ is obtained. In addition, when the algebraic surface generation unit 16 obtains $b(t)=2t^4+6t^3+9t^2+3t+4$ from $a(t)$ and $u_x(t)$, $u_y(t)$, $v_x(t)$, and $v_y(t)$ according to equation (11) (ST11), the algebraic surface generation unit 16 transmits $b(t)$ to the control unit 11.

With the above operation, a fibration $E_t(x, y, t)$ of the algebraic surface X which is a public key and the two sections $D_1$ and $D_2$ as private keys are obtained as indicated by equations (13) and (14) given below:

$$E_t(x, y, t): y^2+y-x^3-(-t^3+11t^2-3t-3)x-2t^4-6t^3-9t^2-3t-4=0 \quad (13)$$

$$D_1: (u_x(t), u_y(t), t)=(t+1, t^2+1, t)$$

$$D_2: (v_x(t), v_y(t), t)=(t^2+1, t^3+1, t) \quad (14)$$

The control unit 11 sets the maximum value of the degrees of 1-variable polynomials contained in the sections $D_1$ and $D_2$ to d (ST12). In this case, d=3. The control unit 11 then selects r in the following manner (ST13).

$$r=(d_x+1+d_y+1)d+d_t=(4+3)*3+4=25$$

For the sake of simplicity, assume that in this embodiment, r=22.

<First Variation>

The first variation of this embodiment will be described next. The flow of processing in the key generation apparatus in a case wherein the public keys p, r, and d are fixed parameters will be described with reference to the overall arrangement shown in FIG. 4 and the flowchart shown in FIG. 5. Note that since this variation is almost the same as the embodiment, only different portions will be described below. In the first variation, since the field p is fixed, a fixed parameter storage unit 18 is provided in place of the prime number generation unit 12. In addition, the processing of reading the prime p from the fixed parameter storage unit 18 (ST2') replaces the prime generation processing.

After $u_x(t)$, $u_y(t)$, $v_x(t)$, and $v_y(t)$ are calculated, the control unit 11 reads the predetermined parameters r and d from the fixed parameter storage unit 18 (ST10-1), and compares a highest degree d' of $u_x(t)$, $u_y(t)$, $v_x(t)$, and $v_y(t)$ with the read parameter d to check whether d'≦d (ST10-2).

In this case, if this condition is not satisfied, the flow returns to step ST3 to repeat the processing from the generation of the 1-variable polynomial $\lambda_x(t)$. If the condition is satisfied, it is checked whether d' and r satisfy three conditions (3), (5), and (4) associated with r. For example, in the case of the algebraic surface defined by equation (13), since $d_x=3$ and $d_y=2$, it is at least necessary to satisfy $e_x=4$, $e_y=3$, and $e_t=0$, and it suffices to check, upon substation of these values, whether the above conditions are satisfied. If the conditions are not satisfied, the processing is repeated from the generation of $\lambda_x(t)$. If the conditions are satisfied, it means that a key is generated. This key is then sent to the key output unit 17. The key output unit 17 outputs the generated public key and private keys.

(Flow of Processing in Decryption Apparatus)

Figure 6:
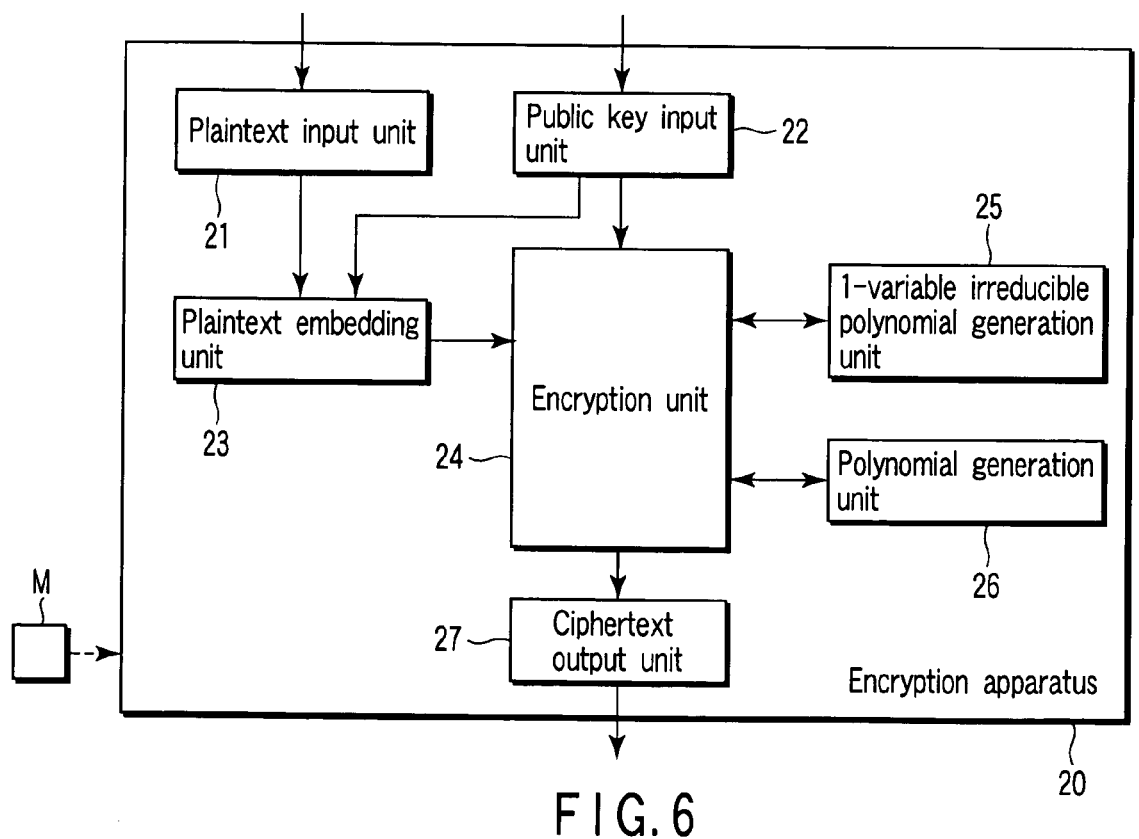
FIG. 6 is a block diagram showing the overall arrangement of an encryption apparatus according to the first embodiment.
Figure 7:
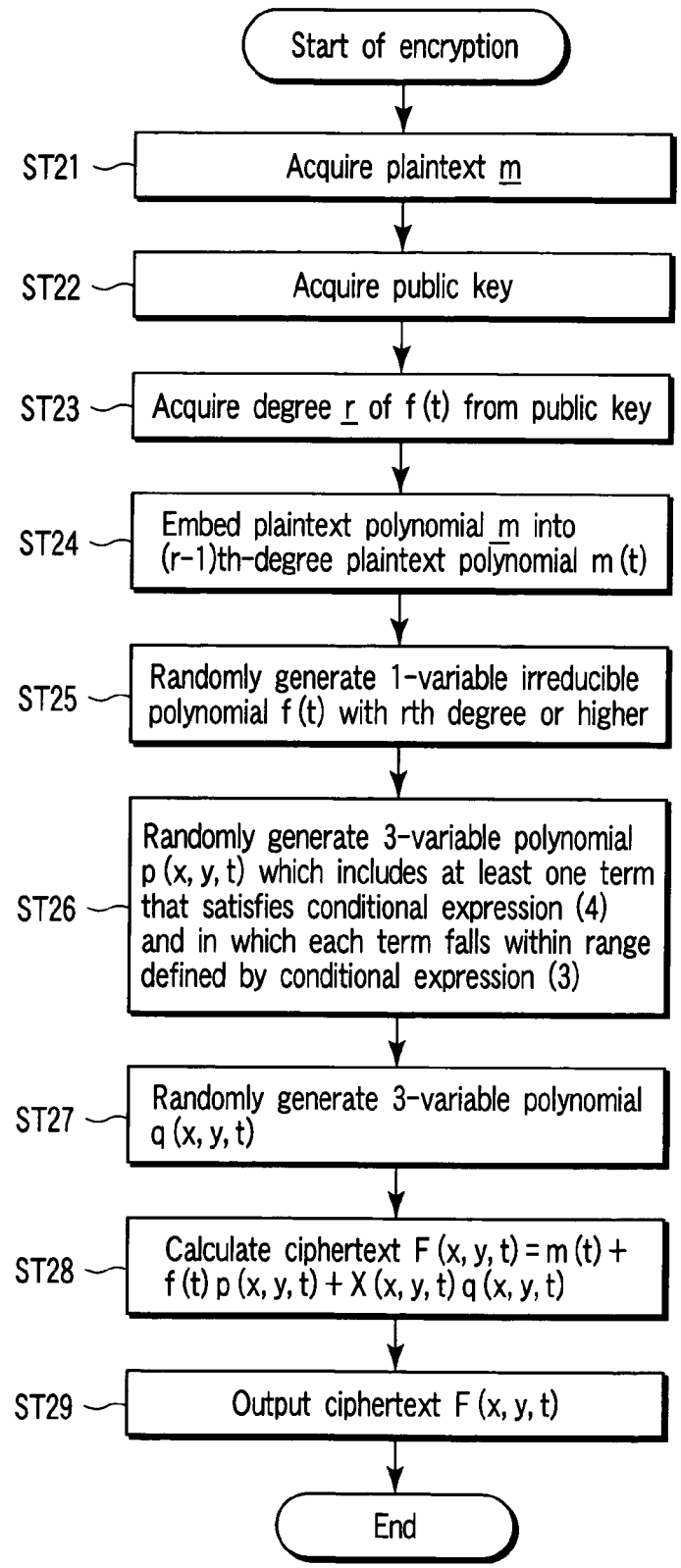
FIG. 7 is a flowchart for explaining the flow of processing in the encryption apparatus according to the first embodiment.

The arrangement of the encryption apparatus and the flow of processing according to this embodiment will be described next with reference to the overall arrangement shown in FIG. 6 and the flowchart shown in FIG. 7. An encryption apparatus 20 includes a plaintext input unit 21, public key input unit 22, plaintext embedding unit 23, encryption unit 24, 1-variable irreducible polynomial generation unit 25, polynomial generation unit 26, and ciphertext output unit 27. The units 21 to 23 and 25 to 27 are controlled by the encryption unit 24 so as to execute the operation shown in FIG. 7 as a whole. This operation will be described in more detail below.

The encryption apparatus 20 starts the processing by acquiring a plaintext m from the plaintext input unit 21 and acquiring public keys X(x, y, t), p, r, and d from the public key input unit 22. In this case, the public keys are following keys obtained by key generation processing:

1. P=17
2. fibration of an algebraic surface X on $F_{17}$:

$$E_t(x, y, t): y^2 + y - x^3 - (-t^3 + 11t^2 - 3t - 3)x - 2t^4 - 6t^3 - 9t^2 - 3t - 4 = 0$$

3. lowest degree r=22 of a 1-variable irreducible polynomial f(t) on Fp
4. highest degree d=3 of polynomials $u_x(t)$, $u_y(t)$, $v_x(t)$, and $v_y(t)$ in a section First of all, the encryption apparatus 20 receives a plaintext from the plaintext input unit 21 (ST21), and receives public keys from the public key input unit 22 (ST22). At this time, of the public keys, the plaintext embedding unit 23 acquires r=22, which is the lowest degree of the 1-variable irreducible polynomial f(t), and characteristic p=17 of a prime field (ST23).

The plaintext embedding unit 23 divides the plaintext m transmitted from the plaintext input unit 21 by a bit length smaller than the bit length of the characteristic p of the plaintext m by one bit. In this case, since p=17, the plaintext m can be divided every four bits. For example, the plaintext "m=0x315763ef25c04c792ef151" in hexadecimal notation is divided every four bits, and the resultant values are embedded as coefficients of a plaintext polynomial m(t) as indicated by the following equation (ST24):

$$m(t) = 3t^{21} + t^{20} + 5t^{19} + 7t^{18} + 6t^{17} + 3\,t^{16} + 15t^{15} + 11t^{14} + 2t^{13} + 5t^{12} + 12t^{11} + 0t^{10} + 4t^9 + 12t^8 + 7t^7 + 9t^6 + 2t^5 + 14t^4 + 15t^3 + t^2 + 5t + 1$$

The plaintext embedding unit 23 transmits the plaintext polynomial m(t) to the encryption unit 24. The public key input unit 22 transmits the public keys to the encryption unit 24.

Upon receiving the plaintext polynomial and public keys, the encryption unit 24 transmits r and p of the public keys to the 1-variable irreducible polynomial generation unit 25. The 1-variable irreducible polynomial generation unit 25 randomly generates a 1-variable irreducible polynomial f(t) with a degree higher than the degree r (ST25), and sends back the obtained polynomial f(t) to the encryption unit 24.

In this case, the irreducible polynomial is generated by repeating irreducibility determination on Fp until a random 1-variable polynomial with a degree higher than r becomes an irreducible polynomial. Assume that the following polynomial f(t) is generated as a 22nd-degree irreducible polynomial:

$$f(t) = t^{22} + 5t^{21} + 11t^{20} + 8t^{19} + 4t^{18} + 6t^{17} + 13t^{16} + 5t^{15} + 10t^{14} + 9t^{13} + 13t^{12} + t^{11} + 2t^{10} + 5t^9 + 8t^8 + 4t^7 + 7t^6 + 3t^5 + 7t^4 + 11t^3 + 15t^2 + t + 7$$

Upon obtaining the 1-variable irreducible polynomial f(t), the encryption unit 24 transmits p to the polynomial generation unit 26. The polynomial generation unit 26 randomly generates a 3-variable polynomial p(x, y, t) in which each term satisfies condition (3) and a term that satisfies condition (4) exists (ST26). In this case, for the sake of simplicity, a random polynomial is assumed to be the following:

$$p(x, y, t) = 7x^4y^3 + 13x^3y^3 + 4x^2y^2 + 15x^3y + 3xt^3 + 6x^2yt^2 + 8t + 4$$

Each term of this equation satisfies the degree relationship "$3(e_x + e_y) + e_t < 22$", and the equation includes the term $7x^4y^3$ that satisfies condition (4). Note that the polynomial generation unit 26 returns the generated 3-variable polynomial p(x, y, t) to the encryption unit 24.

Upon obtaining the 3-variable polynomial p(x, y, t), the encryption unit 24 transmits p, r, and d of the public keys to the polynomial generation unit 26 to make it generate a random 3-variable polynomial q(x, y, t) (ST27).

For the sake of simplicity, q(x, y, t) is assumed to be the following:

$$q(x, y, t) = xy + y^2 + 3t^4 + 13t^3 + 4t^2 + 8t + 4$$

The encryption unit 24 calculates and expands a ciphertext F(x, y, t) by using m(t), f(t), p(x, y, t), and q(x, y, t) obtained by the above processing and the algebraic surface X(x, y, t) as a public key according to equation (6) (ST28). In this case, the ciphertext F(x, y, t) is given as follows:

$$\begin{aligned}F(x, y, t) = &\,13 + 12x + 15tx^3y + 10t^3x^2y^2 + 13t^{11}x^3y^3 + \\&13t^{17}x^2y + 7t^9x^2y + t^{16}x^2y^2 + 4t^{22}x^2y^2 + 13t^{23}x^2y + \\&7t^{20}x^2y + 9t^{18}x^3y^3 + 5t^5x^3y^3 + 8t^8x^2y^3 + 16t^{13}x^3y + \\&3t^4x^3y + 3xty^2 + 2t^{19}x^3y^3 + 6t^4x^3y^3 + 3t^2x^4y^3 + \\&2t^{14}x^4y^3 + 13t^{11}x^3y + 4t^2x^3y + 15t^{22}x^2y + 7t^{15}x^3y + \\&9t^2x^2y^2 + 15t^{11}x^3y + 6t^{13}x^2y + 11t^7x^4y^3 + 9t^{20}x^4y^3 + \\&t^9x^4y^3 + 7t^{11}x^4y^3 + 8t^{17}x^4y^3 + 14t^{10}x^4y^3 + 2t^8 + t^7 + 4y + \\&3t^{15}x^2y^2 + 7t^{22}x^4y^3 + 7t^{20}x^3y^3 + 6xt^2y^2 + 16t^{16}x^3y^3 + \\&16t^{18}x^2y^2 + 7t^9x^3y + 9t^{10}x^3y^3 + 11t^{18}x^4y^3 + 10t^{18}x^2y + \\&14t^{21}x^3y^3 + 7\,t^{17}x^2y^2 + 2t^{13}x^2y^2 + 16t^7x^2y^2 + 2t^8x^3y^3 + \\&14t^2y^2 + 15t^5x^2y + 9t^3x^4y^3 + 6t^6x^3y^3 + 6\,t^{14}x^2y^2 + \\&12t^{13}x^4y^3 + 7t^{21}x^3y + 3t^9x^2y^2 + 3t^6x^3y + 6t\,t^5x^4y^3 + \\&6t^{12}x^4y^3 + t^7x^2y + 11t^3xy + 8t^6x^2y + t^{21}x^4y^3 + 5t^8x^4y^3 + \\&t^{18}x^3y^3 + 8t^{16}x^3y + xt^3y^2 + 15t^{22}x^3y + 14t^{14}x^3y + \\&4t^{11}x^2y + 14t^{21}x^2y + 12t^{20}x^3y + t^7x^3y^3 + 7x^2yt^3 + \\&13t^{22}x^3y^3 + 12t^3x^3y + 8t^{12}x^3y + t^{19}x^3y + 12t^{12}x^2y + \\&3t^{15}x^2y + 15t^6x^4y^3 + 16t^{12}x^3y^3 + 4t^5x^4y^3 + 15\,t^{19}x^2y^2 + \\&9t^7x^3y + 12t^{15}x^2y^2 + 15t^4xy + 8t^2x^3y^3 + y^3 + 13tx^3y^3 + \\&13t^{10}x^3y + 11t^6x^2y^2 + 5t^{15}x + 7tx^4y^3 + 15t^4x^4y^3 + 8t^2xy + \\&11t^5x^3y + 5t^4x^2y + 10t^{20}x^2y^2 + 5xt^3 + 9xt^2 + 2xt + 13t^{15} + \\&4t^{14} + 6t^{13} + 3x^2ty + 15t^{13}x^3y^3 + 7t^2x^3y^3 + 10t^{14}x^2y + \\&9t^{16}x^2y + 13xy + 6t^{24}x^2y + 10t^{17}x^3y^3 + t^{15}x^4y^3 + 4tx^2y^2 + \\&14t^{10}x^2y + 14t^9x^3y^3 + 3t^{21}x^2y^2 + 14t^{15}x^3y^3 + 15t^8x^2y^2 + \\&2t^{19}x^2y + 14txy + 5t^{19}x^4y^3 + 13t^{17}x + t^{19} + 3t^{18} + 15t^{17} + \\&11t^4x^2y^2 + t^8x^3y + t^{12}x^2y^2 + 5\,t^{17}x^3y + 5t^{19}x + 15t^{11} + \\&14t^{10} + 3t^9 + 14t^{12} + 10t^{16} + 6x^3y^3 + 9t^{21} + 7t^{20} + 15t^{24}x + \\&3t^{14}x + 12t^{21}x + 11x^2y^2 + 10t^{16}x + 15t^{18}x + 15x^4y^3 + \\&7t^7x + 13t^6x + 16t^{23}x + 11t^{14}x^3y + 7t^{22}x + 3t^{25}x + 3x^3y + \\&t^{20}x + 4t + 10t^2 + 2t^3 + 4t^4 + 6t^5 + 16t^6 + 13x^3 + 8t^{10}x^2y^2 + \\&3yt^4 + 13yt^3 + 4yt^2 + 8yt + 3x^2y + 10t^{22} + 6t^{13}x + 15t^{12}x + \\&7t^{11}x + 12t^{10}x + 4t^9x + 9t^8x + 8t^{23} + y^4 + 15xt^4 + y^3x + \\&y^2t^4 + 7y^2t^3 + 12y^2t^2 + 5y^2t + 16x^4y + 16x^3y^2 + 14x^3t^4 + \\&4x^3t^3 + 13x^3t^2 + 9x^3t + 4xy^2\end{aligned}$$

The encryption unit 24 modifies the ciphertext F(x, y, t) in accordance with a format determined in advance according to need and outputs the result from the ciphertext output unit 27 (ST29). The encryption processing is then terminated.

When the second variation is applied to the encryption apparatus 20 of this embodiment, since the degree condition of p(x, y, t) is eliminated, p(x, y, t) can be generated by the same method as that for q(x, y, t).

The third variation is spontaneously realized with respect to the encryption processing in this embodiment. The fourth variation is realized in the same manner as this embodiment. In this case, the plaintext embedding unit 23 divides the plaintext m into blocks by the same method as in this embodiment and embeds the blocks in the coefficients of m(t) and some predetermined coefficients of f(t). Thereafter, it suffices if the 1-variable irreducible polynomial generation unit 25 randomly sets the remaining coefficients of f(t).

The sixth variation is realized as it is, if there is newly added the processing of generating the new plaintext m' by causing the plaintext embedding unit 23 to convert the plaintext into equation (vari 6) by using the predetermined hash function $\underline{h}$.

(Decryption Apparatus and Flow of Processing)

Figure 8:
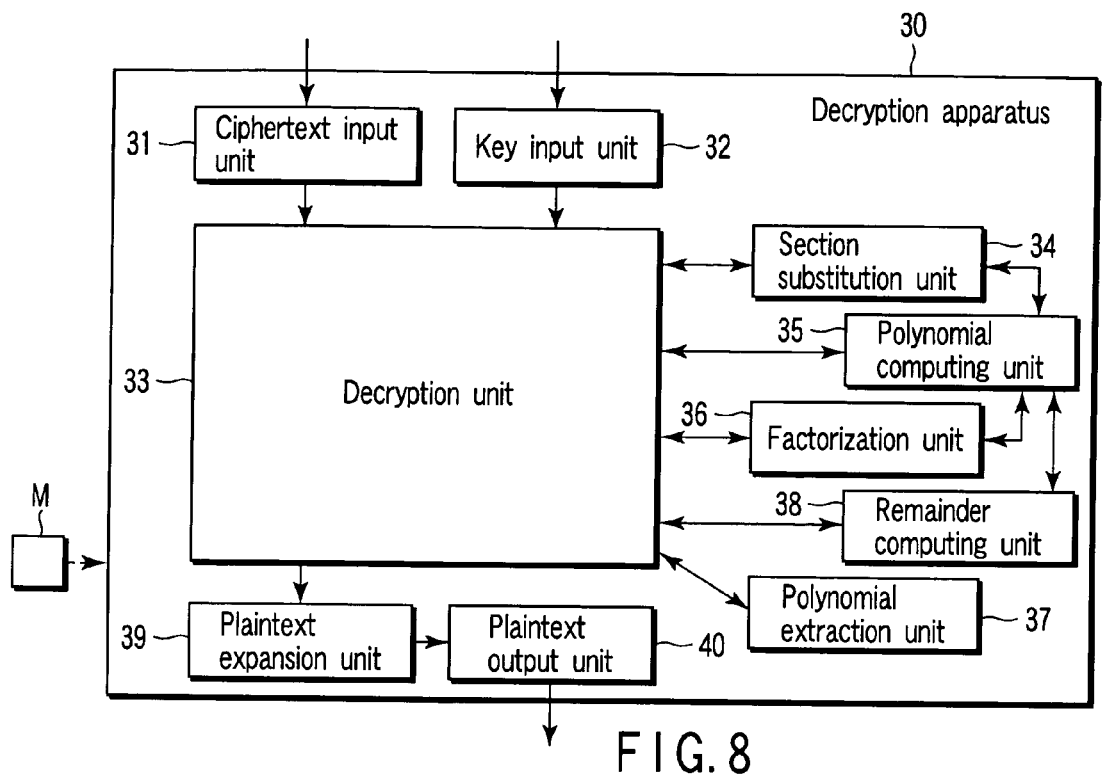
FIG. 8 is a block diagram showing the overall arrangement of a decryption apparatus according to the first embodiment.
Figure 9:
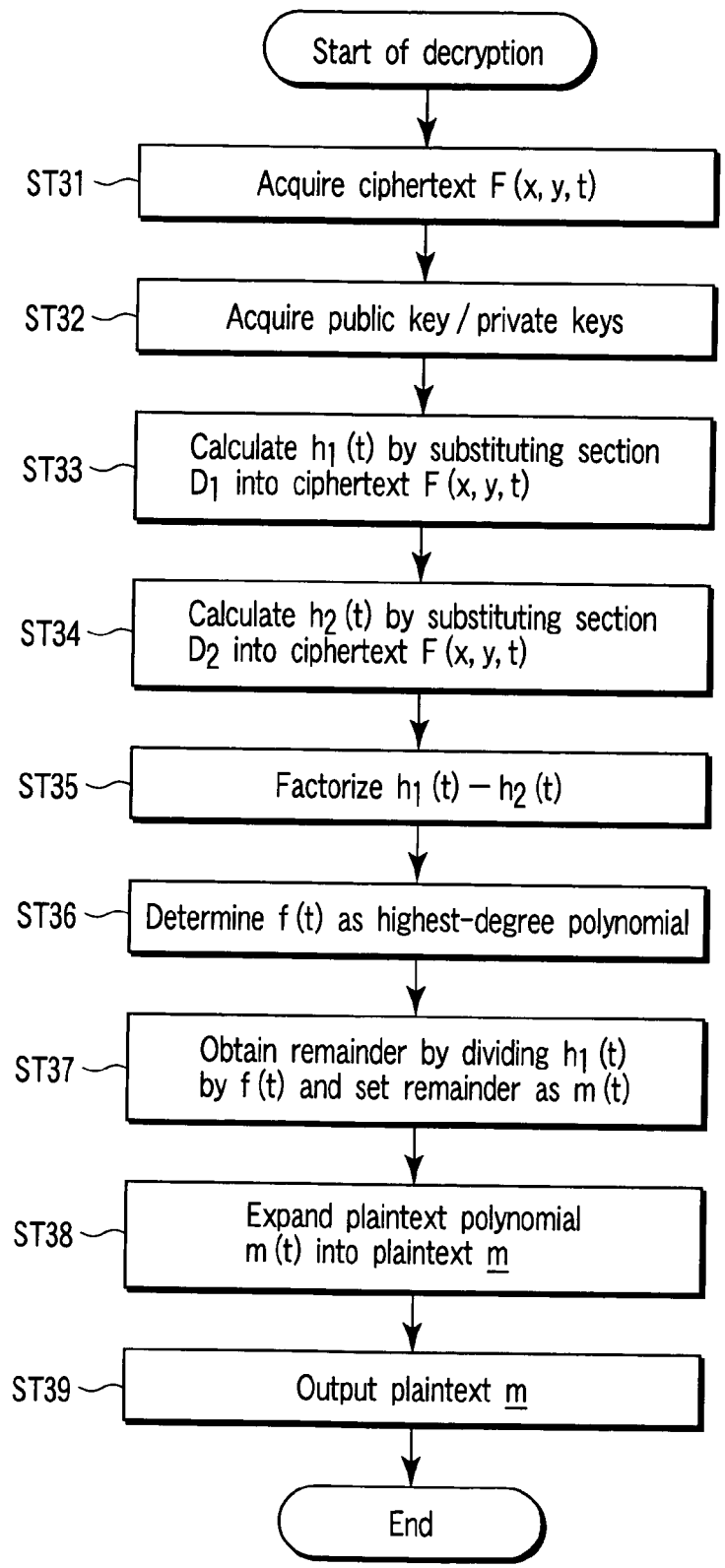
FIG. 9 is a flowchart for explaining the flow of processing in the decryption apparatus according to the first embodiment.

Lastly, the arrangement of the decryption apparatus and the flow of processing according to this embodiment will be described below with reference to the overall arrangement shown in FIG. 8 and the flowchart shown in FIG. 9. A decryption apparatus 30 includes a ciphertext input unit 31, key input unit 32, decryption unit 33, section substitution unit 34, polynomial computing unit 35, factorization unit 36, polynomial extraction unit 37, remainder computing unit 38, plaintext expansion unit 39, and plaintext output unit 40. The units 31, 32, and 34 to 40 are controlled by the decryption unit 33 so as to execute the operation shown in FIG. 9 as a whole. This operation will be described in detail below.

The decryption apparatus 30 acquires a ciphertext F(x, y, t) from the ciphertext input unit 31 (ST31), and acquires public keys X(x, y, t), $\underline{p}$, $\underline{r}$, and $\underline{t}$ and private keys from the key input unit 32 (ST32), thereby starting the processing. The private keys are the two sections $D_1$ and $D_2$ indicated in equation (14) for key generation. The acquired ciphertext, public keys, and private keys are sent to the decryption unit 33 to start decryption processing.

The decryption unit 33 transmits the ciphertext F(x, y, t) and section $D_1$ to the section substitution unit 34. The section substitution unit 34 obtains $h_1(t)$ given below by substituting $D_1$ into F(x, y, t) and using the polynomial computing unit 35 as needed (ST33):

$$h_1(t) = F(u_x(t), u_y(t), t)$$
$$= 13 + 3t^8 + 8t^7 + 2t^{15} + 8t^{14} + 16t^{13} + 16t^{19} +$$
$$4t^{18} + t^{17} + 12t^{25} + 14t^{11} + t^{10} + 13t^9 + 16t^{12} +$$
$$t^{16} + 7t^{21} + 11t^{20} + 6t^{24} + 11t^{27} + 9t + 12t^2 + 11t^3 +$$
$$8t^4 + 4t^5 + 12t^6 + 16t^{22} + 9t^{23} + 10t^{30} + 2t^{28} + 9t^{26} +$$
$$7t^{32} + 8t^{31}$$

In this case, the polynomial computing unit 35 performs addition, subtraction, multiplication, and division with respect to 1-variable polynomials. The section substitution unit 34 obtains $h_2(t)$ given below by substituting the section $D_2$ into F(x, y, t) in the same manner (ST34):

$$h_2(t) = F(v_x(t), v_y(t), t)$$
$$= 13 + 3t^7 + 9t^{15} + 5t^{14} + 10t^{19} + 7t^{18} + 3t^{17} +$$
$$t^{34} + 6t^{33} + 7t^{36} + 12t^{35} + 16t^{38} + 7t^{39} + 11t^{25} +$$
$$6t^{11} + 7t^{10} + 16t^9 + 12t^{12} + 8t^{16} + 9t^{21} + t^{20} +$$
$$16t^{24} + 6t^{29} + 3t^{27} + 9t + 2t^2 + 16t^3 + 16t^4 + 3t^5 +$$
$$t^6 + 5t^{22} + 12t^{23} + 12t^{30} + 10t^{28} + 15t^{26} + 6t^{32} + 7t^{31}$$

Obtained $h_1(t)$ and $h_2(t)$ are sent out from the section substitution unit 34 to the decryption unit 33. The decryption unit 33 transmits $h_1(t)$ and $h_2(t)$ to the polynomial computing unit 35 and makes it subtract them from each other. The decryption unit 33 then transmits the result to the factorization unit 36 to make it perform factorization (ST35), thereby obtaining the factorization result represented by equation (15):

$$h_1(t)-h_2(t)=10(t+15)^2(t^{22}+5t^{21}+11t^{20}+8t^{19}+4t^{18}+6t^{17}+$$
$$13t^{16}+5t^{15}+10t^{14}+9t^{13}+13t^{12}+t^{11}+2t^{10}+5t^9+8t^8+$$
$$4t^7+7t^6+3t^5+7t^4+11t^3+15t^2+t+7)(t+7)(t^{10}+7t^9+$$
$$3t^8+12t^7+7t^6+10t^5+14t^4+t^3+4t^2+4t+2)t^2(t^2+14t+$$
$$1) \quad (15)$$

In this case, an irreducible polynomial f(t) appears as a highest-degree factor. The decryption unit 33 transmits the right side of equation (15) which is the factorization result to the polynomial extraction unit 37 to make it extract f(t) as a factor having the highest degree (ST36). The decryption unit 33 sends f(t) and $h_1(t)$ to the remainder computing unit 38. The remainder computing unit 38 divides $h_1(t)$ by f(t) to calculate a plaintext polynomial m(t) as the remainder given below (ST37), and transmits the obtained polynomial m(t) to the decryption unit 33.

$$m(t)=3t^{21}+t^{20}+5 t^9+7t^{18}+6t^{17}+3t^{16+15}t^{15}+11t^{14+2}t^{13}+$$
$$5t^{12}+12t^{11}+4t^9+12t^8+7t^7+9t^6+2t^5+14t^4+15t^3+t^2+$$
$$5t+1$$

The decryption unit 33 transmits m(t) to the plaintext expansion unit 39. The plaintext expansion unit 39 expands m(t) to obtain plaintext m=0x315763ef25c04c792ef151 (ST38). The plaintext expansion unit 39 outputs the plaintext $\underline{m}$ from the plaintext output unit 40 (ST39). With this operation, the decryption apparatus 30 terminates the decryption processing.

Figure 10:
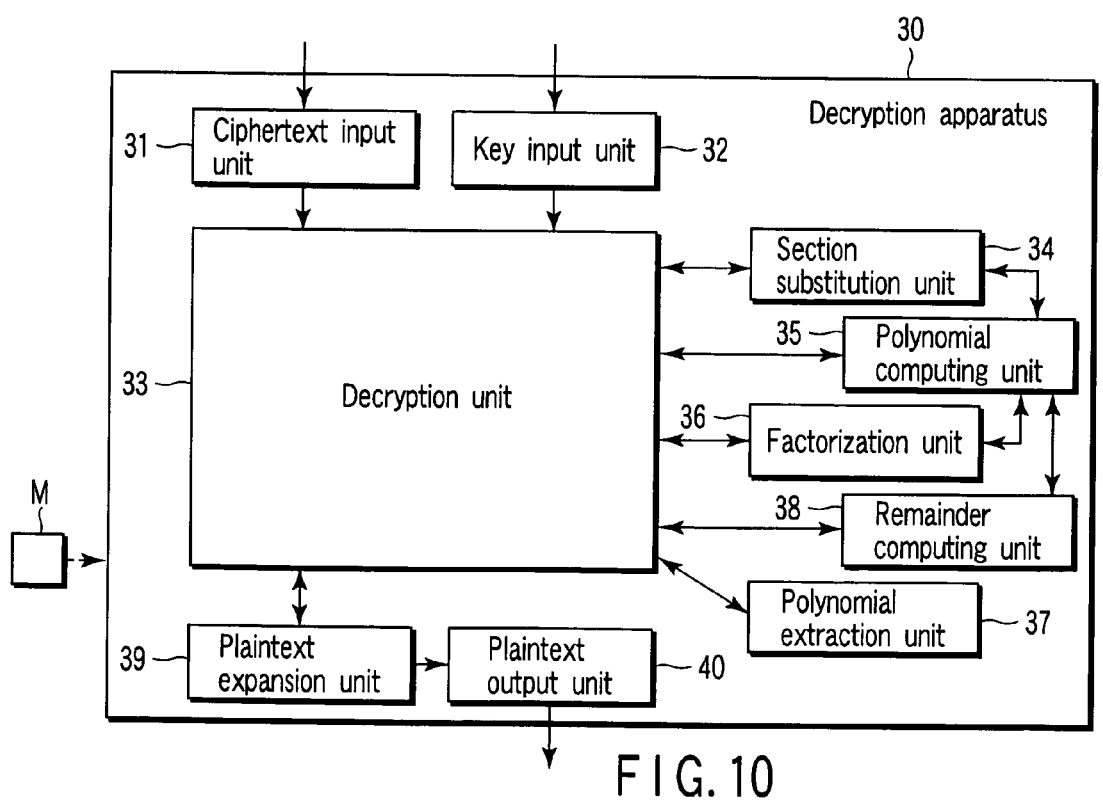
FIG. 10 is a block diagram showing the overall arrangement of the second variation of the decryption apparatus according to the first embodiment.
Figure 11:
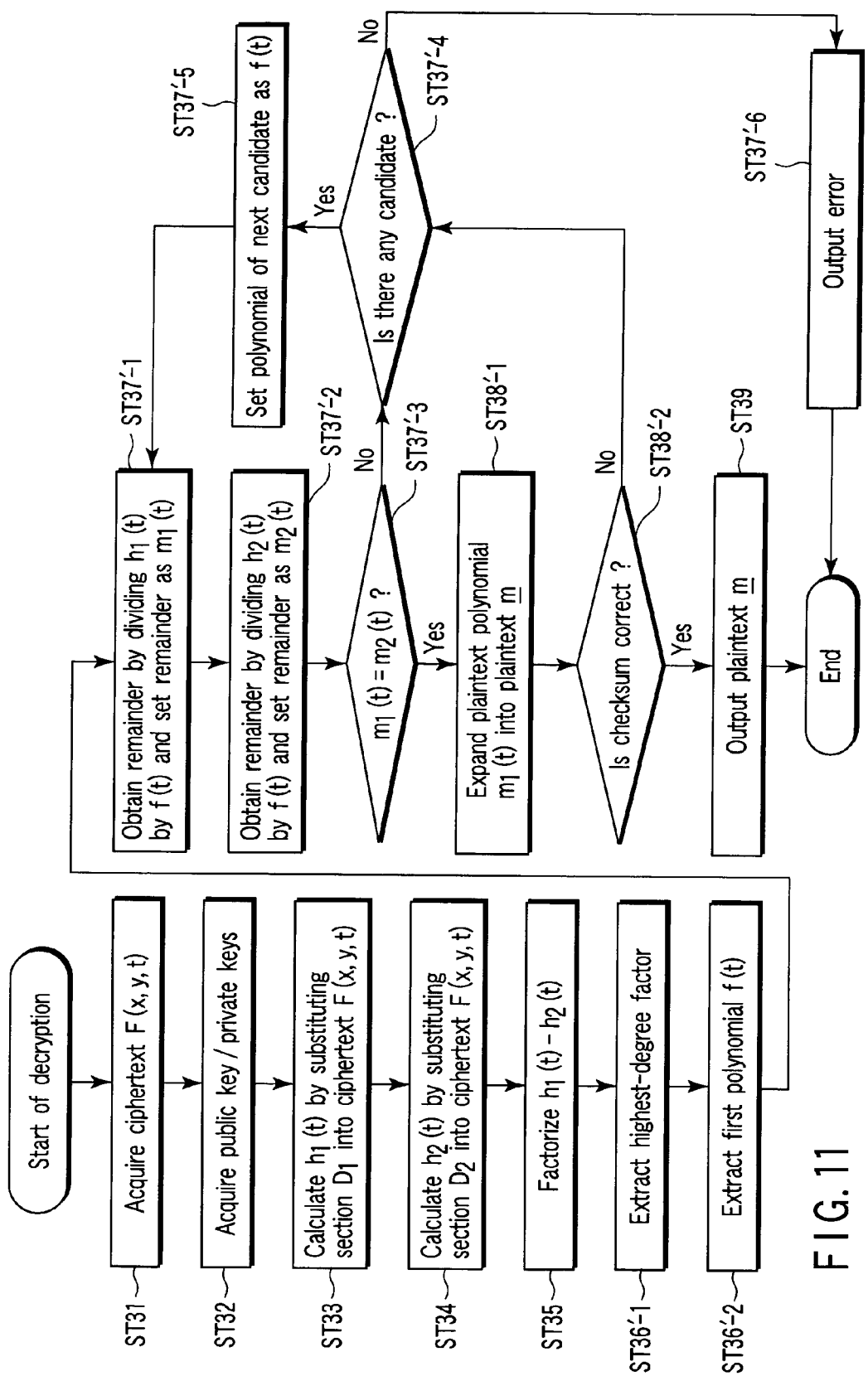
FIG. 11 is a flowchart for explaining the flow of processing in the second variation of the decryption apparatus according to the first embodiment.

Note that FIG. 10 shows an overall arrangement in the second variation, and FIG. 11 shows an algorithm for decryption processing. The arrangement in FIG. 10 differs from that in FIG. 8 only in that two-way communication is performed between the plaintext expansion unit 39 and the decryption unit 33.

Since decryption processing in the second variation is almost the same as that described above, only different portions will be described below. In this decryption processing, since a plurality of candidates for the 1-variable irreducible polynomial f(t) may appear, the following processing is performed for each such candidate.

As shown in FIG. 11, after steps ST31 to ST35 are executed in the same manner as described above, the decryption unit 33 extracts a highest-degree factor (ST36'-1) and causes the polynomial extraction unit 37 to extract a first polynomial f(t) (ST36'-2). The decryption unit 33 divides $h_1(t)$ by f(t) by using the remainder computing unit 38 as in decryption processing to obtain a plaintext polynomial $m_1(t)$ as the remainder (ST37'-1). Likewise, the decryption unit 33 divides $h_2(t)$ by f(t) by using the remainder computing unit 38 to obtain a plaintext polynomial $m_2(t)$ as the remainder (ST37'-2).

The decryption unit 33 checks whether or not $m_1(t)$ is equal to $m_2(t)$ (ST37'-3). If they are not equal, since it indicates that f(t) is not correct as a divisor, the decryption unit 33 performs similar processing for the next candidate for f(t) (ST37'-4 and ST37'-5).

If $m_1(t)$ and $m_2(t)$ are equal, the decryption unit 33 causes the plaintext expansion unit 39 to expand $m_1(t)$ into a plaintext $\underline{m}$ in the same manner as in decryption processing (ST38'-1). The plaintext expansion unit 39 checks the checksum to check the validity of the plaintext (ST38'-2).

If the checksum is not correct, since it indicates that decryption is performed by using an incorrect polynomial f(t), the decryption unit 33 repeats the same processing by using the next candidate for f(t) (ST37'-4 and ST37'-5). If the checksum is correct, since it is highly possible that decryption has been correctly performed, the decryption unit 33 outputs the plaintext from the plaintext output unit 40. The processing is then terminated.

Note that if there is no next candidate in the processing of extracting the next candidate for f(t), it indicates that no correct polynomial f(t) could not be obtained, and hence an error is output to terminate the processing (ST37'-6).

This decryption processing may also employ a scheme in which all the candidates for f(t) are employed for decryption in the same manner as described above, and if there are two plaintexts which have passed two types of checks, the two plaintexts are output. With this operation, the receiver who knows that there are two plaintexts requests the sender to transmit a different ciphertext or determines by himself/herself, from the contents of the plaintexts, which plaintext is correct.

Alternatively, the above processing may be executed without performing any checksum operation. In this case, when $m_1(t)=m_2(t)$, the corresponding plaintext is regarded as correct. If there are a plurality of correct plaintexts, all the candidates are output.

The third variation is spontaneously realized in this embodiment as well. The fourth variation is realized by sending f(t) obtained during decryption processing as part of a plaintext to the plaintext expansion unit 39 and causing the plaintext expansion unit 39 to expand a combination of m(t) and f(t) into the plaintext m. The fifth variation can be executed by applying, to each verifying operation, the verification method to be applied to a case wherein there are a plurality of candidates for f(t), which has been described in the last half of this embodiment.

The sixth variation can be realized by causing the plaintext expansion unit 39 to expand the plaintext m' in the same manner as in this embodiment, and checking by using the predetermined hash function h whether or not the obtained plaintext m' satisfies equation (vari 6). If the check result indicates that the plaintext is not correct, an error is output. If the plaintext is correct, the obtained message m is transmitted to the plaintext output unit 40. Note that this variation can be used together with the third variation. In addition, this variation can be used together with the second variation by, for example, executing a check based on equation (vari 6) as checksum operation.

This is the end of the description of the detailed arrangements of the key generation apparatus, encryption apparatus, and decryption apparatus according to the first embodiment of the present invention.

As described above, according to this embodiment, the encryption apparatus 20, decryption apparatus 30, or key generation apparatus 10 based on the public-key cryptographic scheme whose security is based on the divisor finding problem of obtaining a divisor on an algebraic surface, which is a difficult problem that has not been solved by contemporary mathematics, can be realized with the arrangement using the two sections $D_1$ and $D_2$ of algebraic curves (divisors) on the algebraic surface X as private keys. This makes it possible to create a public-key cryptographic scheme which can ensure security even in the advent of a quantum computer, can be securely realized even by current computers, and can be realized under a low-power environment.

Second Embodiment

The second embodiment of the present invention will be described next.

This embodiment uses the following four public keys:
1. a characteristic p of a prime field;
2. a fibration: X(x, y, t)=0 of an algebraic surface X on Fp;
3. a lowest degree r of a 1-variable irreducible polynomial f(t) on Fp; and
4. a highest degree d of polynomials $u_x(t)$ and $u_y(t)$ in a section as a private key.

A private key is a section D given blow:
1. a section of the algebraic surface X on Fp: D: (x, y, t)=($u_x(t)$, $u_y(t)$, t)

The second embodiment greatly differs from the first embodiment in that one section is used as a private key. The second embodiment has the effect of increasing the degree of freedom in key generation as will be described later, in addition to the effect of reducing the private key size.

(Encryption Processing)

An outline of encryption processing in this embodiment will be described. Although the encryption processing is almost the same as that in the first embodiment, the second embodiment generates two ciphertexts $F_1(x, y, t)$ and $F_2(x, y, t)$ unlike the first embodiment which generates one ciphertext $F(x, y, t)$.

More specifically, in the second embodiment, two pairs of different random 3-variable polynomials ($p_1(x, y, t)$, $p_2(x, y, t)$), and ($q_1(x, y, t)$ and $q_2(x, y, t)$) are generated by the same means as that in the first embodiment using f(t) common to them, and the two ciphertexts $F_1(x, y, t)$ and $F_2(x, y, t)$ are generated.

$$F_1(x, y, t)=m(t)+f(t)p_1(x, y, t)+X(x, y, t)q_1(x, y, t)$$

$$F_2(x, y, t)=m(t)+f(t)p_2(x, y, t)+X(x, y, t)q_2(x, y, t)$$

Upon receiving the ciphertexts $F_1(x, y, t)$ and $F_2(x, y, t)$, the receiver performs decryption by using the owned private key D in the following manner. First of all, by substituting D into the ciphertexts $F_1(x, y, t)$ and $F_2(x, y, t)$, two equations $h_1(t)$ and $h_2(t)$ are obtained on the basis of the same idea as in the first embodiment.

$$h_1(t) = F_1(u_x(t), u_y(t), t)$$
$$= m(t) + f(t)p_1(u_x(t), u_y(t), t)$$
$$h_2(t) = F_2(u_x(t), u_y(t), t)$$
$$= m(t) + f(t)p_2(u_x(t), u_y(t), t)$$

The sides of the two equations are then subtracted from each other to calculate an equation $h_1(t)-h_2(t)$ given below:

$$h_1(t)-h_2(t)=f(t)\{p_1(u_x(t), u_y(t), t)-p_2(u_x(t), u_y(t), t)\}$$

Thereafter, $h_1(t)-h_2(t)$ is factorized, and a factor having the highest degree is determined as f(t). The subsequent processing is the same as that in the first embodiment, and hence a description thereof will be omitted.

(Key Generation Processing)

Lastly, a key generation method in this embodiment will be described. As in the first embodiment, in this embodiment, key generation is performed by randomly selecting the section D and calculating a fibration corresponding to the section D.

Unlike in the first embodiment, however, in this embodiment, since it is only required to satisfy one section, a key with a high degree of freedom can be generated more easily than in the first embodiment.

In this case, the key generation method will be described by taking the following algebraic surface of algebraic surfaces as an example:

$$X: y^2=x^3+\xi_1(t)x^2y+\xi_2(t)x+\xi_3(t)y+\xi_4(t)$$

In this equation, $\xi_1(t)$, $\xi_2(t)$, $\xi_3(t)$, and $\xi_4(t)$ are 1-variable polynomials. First of all, the characteristic $\underline{p}$ of a prime field is determined. No problem arises in terms of security even if $\underline{p}$ is small. The section D is given as follows:

$$D: (x,y,t) = (u_x(t), u_y(t), t)$$

The 1-variable polynomials $\xi_1(t)$, $\xi_2(t)$, and $\xi_3(t)$ are randomly determined. These polynomials $\xi_1(t)$, $\xi_2(t)$, and $\xi_3(t)$ and the section D are then substituted into the algebraic surface X to obtain $\xi_4(t)$ according to equation (16):

$$\xi_4(t) = u_y(t)^2 - u_x(t)^3 - \xi_1(t)u_x(t)^2 u_y(t) - \xi_2(t)u_x(t) - \xi_3(t)u_y(t) \quad (16)$$

The key generation method can be applied to all algebraic surfaces having $\xi_4(t)$ as constant terms with respect to x and y. This is also an effect which the first embodiment does not have.

Lastly, a method of obtaining $\underline{d}$ and $\underline{r}$ will be described below. Note that $\underline{d}$ and $\underline{r}$ must satisfy inequality (3) from the viewpoint of the decryption method and satisfy inequalities (5) and (4) from the viewpoint of demand for security, $\underline{d}$ is determined as the maximum value of the degrees of $u_x(t)$ and $u_y(t)$ of the section, and $\underline{r}$ may be determined by $$r = (d_x + 1 + d_y + 1)d + d_t$$

The first to fifth variations described in the first embodiment can also be realized in the second embodiment.

<Discussion on Safety>

The security of public-key cryptography according to the second embodiment will be discussed. Basically, the same discussion as that on the security of the first embodiment applies to this discussion. The second embodiment differs from the first embodiment in that two ciphertexts are used, and hence security concerning this point will be discussed. The ciphertexts $F_1(x, y, t)$ and $F_2(x, y, t)$ are subtracted from each other as follows:

$$F_1(x, y, t) - F_2(x, y, t) = f(t)(p_1(x, y, t) - p_2(x, y, t)) - X(x, y, t)(q_1(x, y, t) - q_2(x, y, t))$$

In this equation, although a plaintext polynomial m(t) is eliminated, $q_1(x, y, t) \neq q_2(x, y, t)$. Since the division algorithm does not generally hold for 3-variable polynomials, even if this equation is divided by a 3-variable polynomial X(x, y, t), almost no information can be obtained from the remainder or the like.

(Specific Arrangement of Second Embodiment)

The detailed arrangements of the key generation apparatus, encryption apparatus, and decryption apparatus based on public-key cryptography according to this embodiment and their algorithms will be described next.

(Key Generation Apparatus and Flow of Processing)

Figure 12:
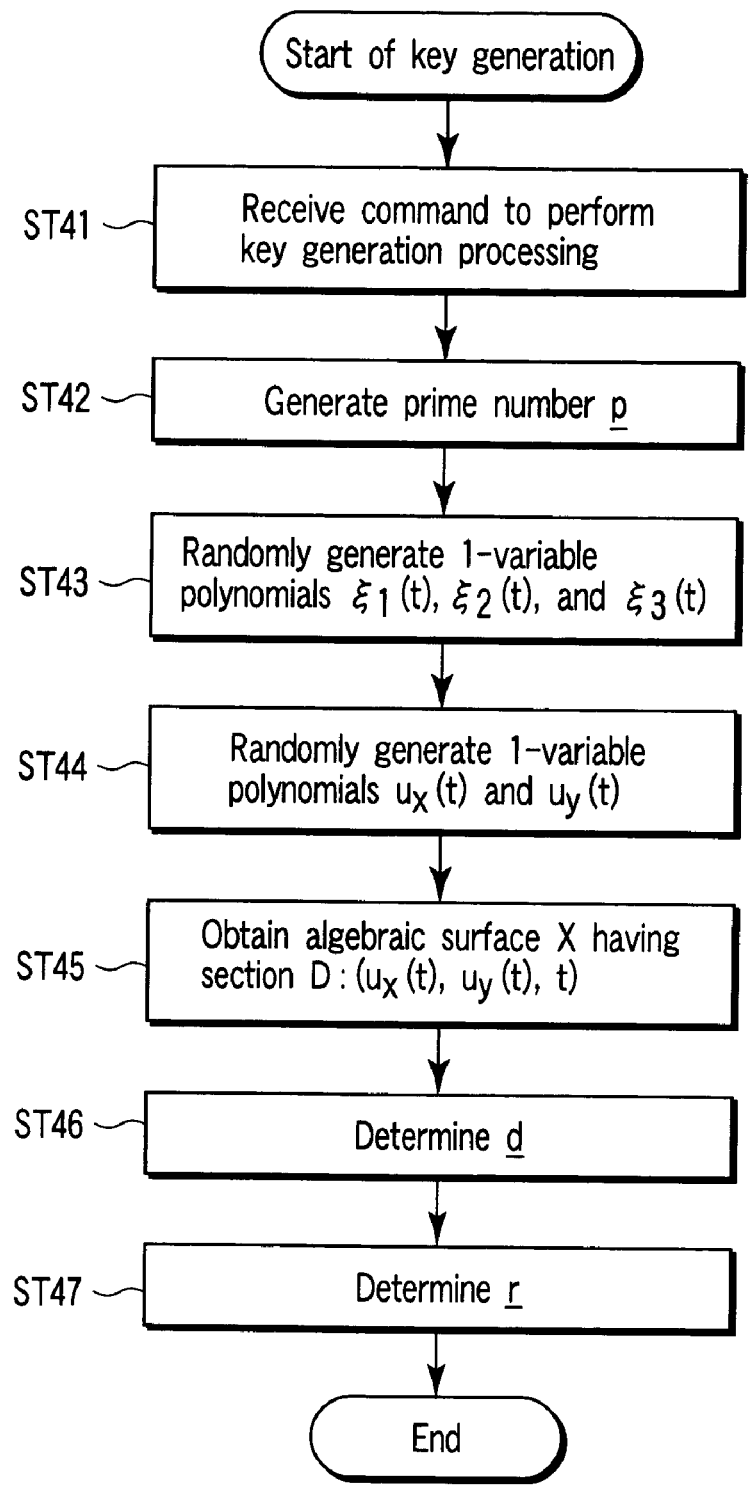
FIG. 12 is a flowchart for explaining the flow of processing in a key generation apparatus according to the second embodiment of the present invention.

The arrangement of the key generation apparatus and the flow of processing according to this embodiment will be described with reference to the overall arrangement shown in FIG. 2 and the flowchart shown in FIG. 12. This embodiment uses an example of an arrangement based on the above algebraic surface:

$$X: y^2 = x^3 + \xi_1(t)x^2 y + \xi_2(t)x + \xi_3(t)y + \xi_4(t)$$

Specific numerical values and expressions are only examples for assisting understanding, and hence do not necessarily coincide with numerical values and expressions, e.g., the degrees of polynomials in particular, which are actually used and have sufficient security.

When a command to start key generation processing is transmitted from an external apparatus or the like to a control unit 11, a key generation apparatus 10 starts the processing. Upon receiving the command (ST41), the control unit 11 requests a prime number generation unit 12 to generate a prime number. The prime number generation method is the same as that in ST2 described above. Assume that prime number $\underline{p}=17$ is generated (ST42).

The control unit 11 transmits the prime number $\underline{p}$ to a section generation unit 13. The section generation unit 13 starts generating a section. First of all, the section generation unit 13 transmits the prime number $\underline{p}$ to a 1-variable polynomial generation unit 14 and repeatedly requests it to generate a 1-variable polynomial, thereby obtaining 1-variable polynomials $\xi_1(t)$ ($=t+1$), $\xi_2(t)$ ($=-t^2+14$), and $\xi_3(t)$ ($=t^2+3t+6$) (ST43).

The polynomial generation unit 14 generates random polynomials in the same manner as in the first embodiment. Upon obtaining $\xi_1(t)$, $\xi_2(t)$, and $\xi_3(t)$, the control unit 11 performs generation processing for random 1-variable polynomials $u_x(t)$ and $u_y(t)$ serving as elements of the section to obtain $u_x(t)$ ($=t-1$) and $u_y(t)$ ($=t^2+2$) (ST4). The control unit 11 transmits $u_x(t)$ and $u_y(t)$ to the section generation unit 13. The section generation unit 13 generates a section D on the basis of the respective 1-variable polynomials $u_x(t)$ and $u_y(t)$, and returns the obtained section D to the control unit 11. Thereafter, the control unit 11 transmits $\xi_1(t)$, $\xi_2(t)$, $\xi_3(t)$, $u_x(t)$, and $u_y(t)$ to an algebraic surface generation unit 16. The algebraic surface generation unit 16 obtains $\xi_4(t)$ given below by repeatedly using a 1-variable polynomial computing unit 15 according to equation (16).

$$\xi_4(t) = (t^2+2)^2 + 16(t+16)^3 + 16(t+1)(t+16)^2(t^2+2) + 16(16t^2+14)(t+16) + 16(t^2+3t+6)(t^2+2)$$

The algebraic surface generation unit 16 transmits the obtained polynomial $\xi_4(t)$ to the control unit 11. With the above operation, the fibration X(x, y, t) of the algebraic surface X which is a public key and the section D as a public key can be obtained as indicated by expressions (17) and (18) given below (ST45):

$$X(x, y, t): y^2 + 16x^3 + 16(t+1)x^2 y + 16(16t^2+14)x + 16(t^2+3t+6)y + 16(t^2+2)^2 + (t+16)^3 + (t+1)(t+16)^2(t^2+2) + (16t^2+14)(t+16) + (t^2+3t+6)(t^2+2) \quad (17)$$

$$D: (u_x(t), u_y(t), t) = (t-1, t^2+2, t) \quad (18)$$

The control unit 11 sets the maximum value of the degrees of the 1-variable polynomials contained in the section D to $\underline{d}$ (ST46). Assume that d=2. The control unit 11 then selects $\underline{r}$ as a proper natural number within a predetermined range and sets it as a degree $\underline{r}$ of a 1-variable irreducible polynomial (ST47). The degree $\underline{r}$ may be determined as follows:

$$r = (d_x + 1 + d_y + 1)d + d_t = (3+4)*2 + 5 = 19$$

In this case, for the sake of simplicity, assume that r=15.

<First Variation>

Figure 4:
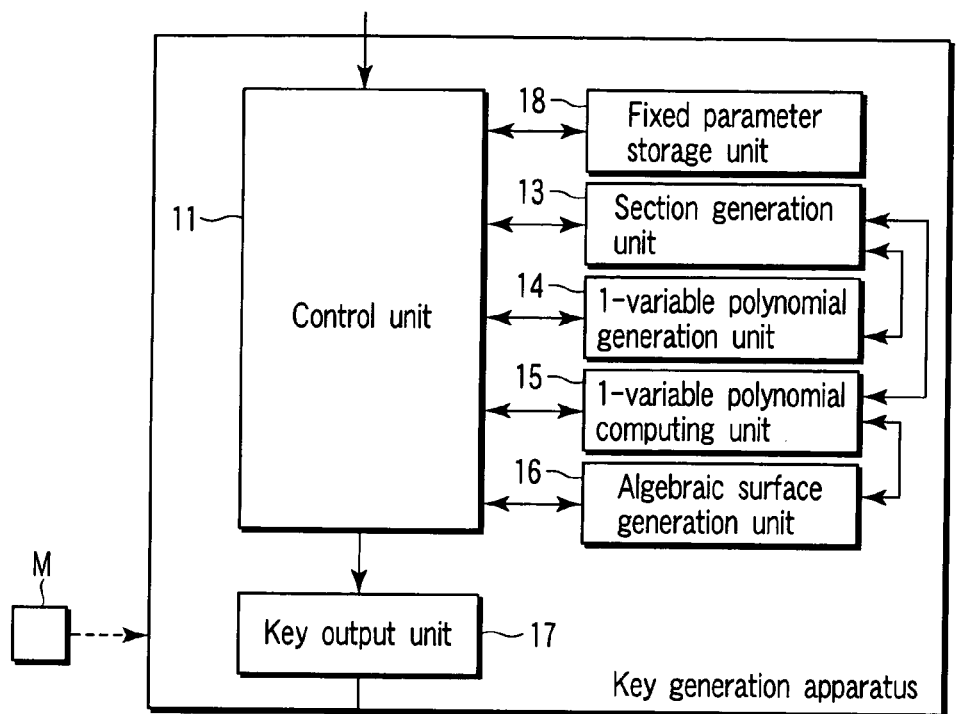
FIG. 4 is a block diagram showing the overall arrangement of the first variation of the key generation apparatus according to the first embodiment.
Figure 5:
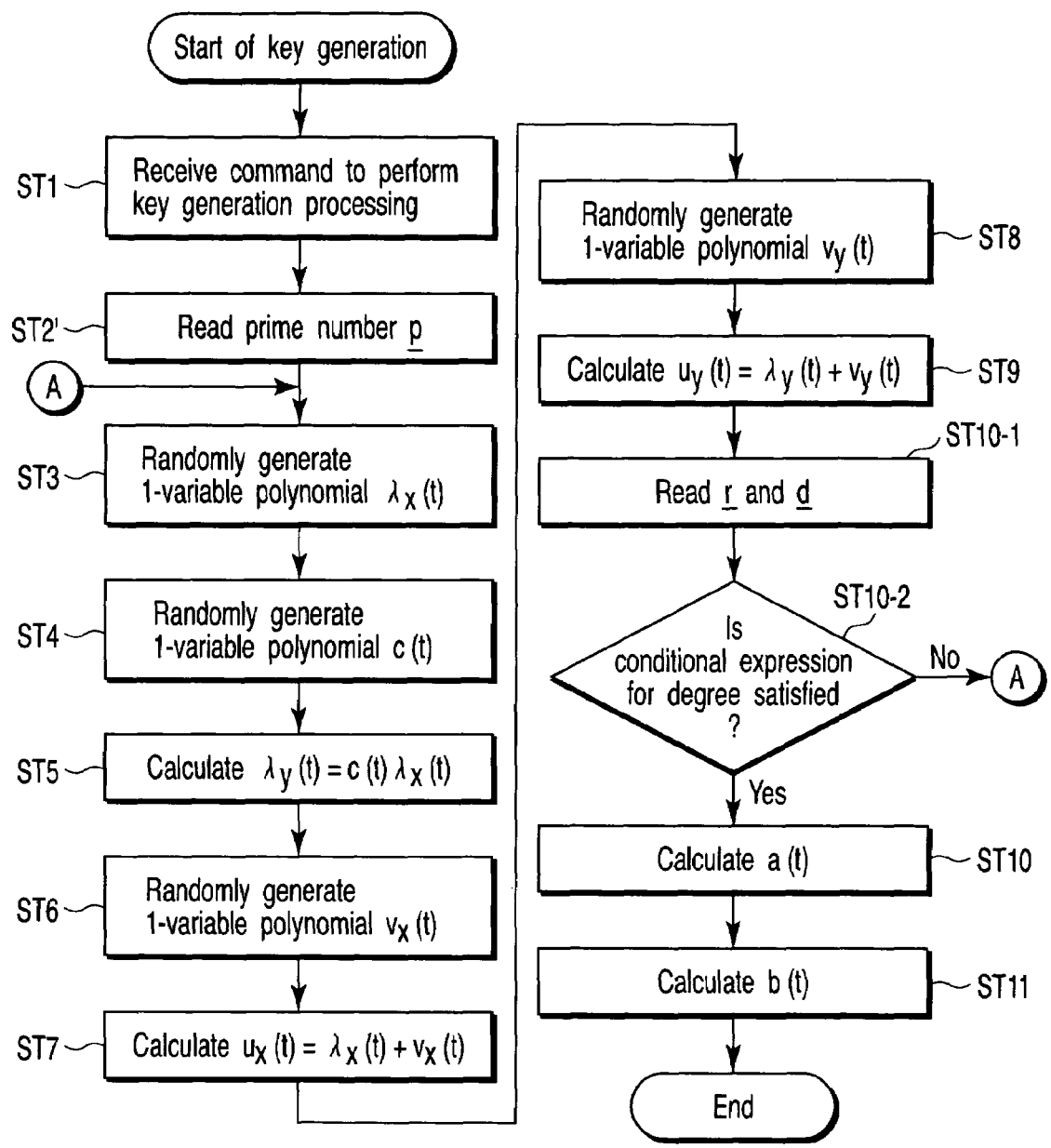
FIG. 5 is a flowchart for explaining the flow of processing in the first variation of the key generation apparatus according to the first embodiment.
Figure 13:
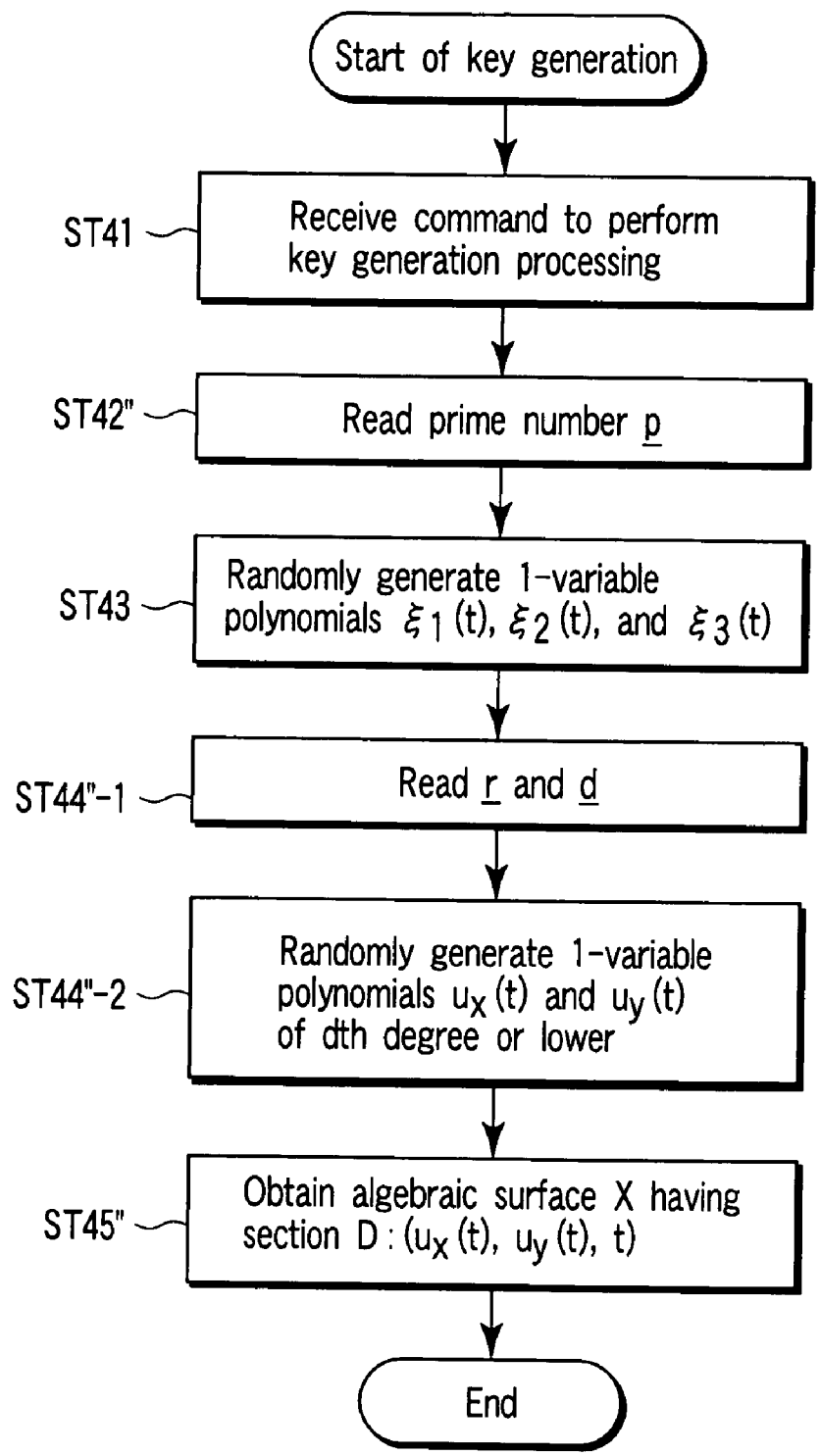
FIG. 13 is a flowchart for explaining the flow of processing in the first variation of the key generation apparatus according to the second embodiment.

The first variation of this embodiment will be described next with reference to the overall arrangement shown in FIG. 4 and the flowchart shown in FIG. 13. In this case, $\underline{p}$, $\underline{r}$, and $\underline{d}$ are fixed. Other arrangements are almost the same as those of the embodiment, and hence only different portions will be described below. In the first variation, since the prime number $\underline{p}$ is fixed, a fixed parameter storage unit 18 is provided in place of the prime number generation unit 12. In addition, the processing of reading $\underline{p}$ from the fixed parameter storage unit 18 (ST42") replaces the prime number generation processing.

Upon reading p, the control unit 11 randomly generates $\xi_1(t)$, $\xi_2(t)$, and $\xi_3(t)$ as in the embodiment. Upon reading $\underline{r}$ and $\underline{d}$ from the fixed parameter storage unit 18 (ST44"-1), the control unit 11 randomly generates 1-variable polynomials $u_x(t)$ and $u_y(t)$ by using the 1-variable polynomial generation unit 14 such that the highest degree becomes d (ST44"-2). Subsequently, the control unit 11 performs the same processing as that in the embodiment (ST45") to generate keys. The generated keys are sent to a key output unit 17, which in turn outputs public and private keys.

(Encryption Apparatus and Flow of Processing)

Figure 14:
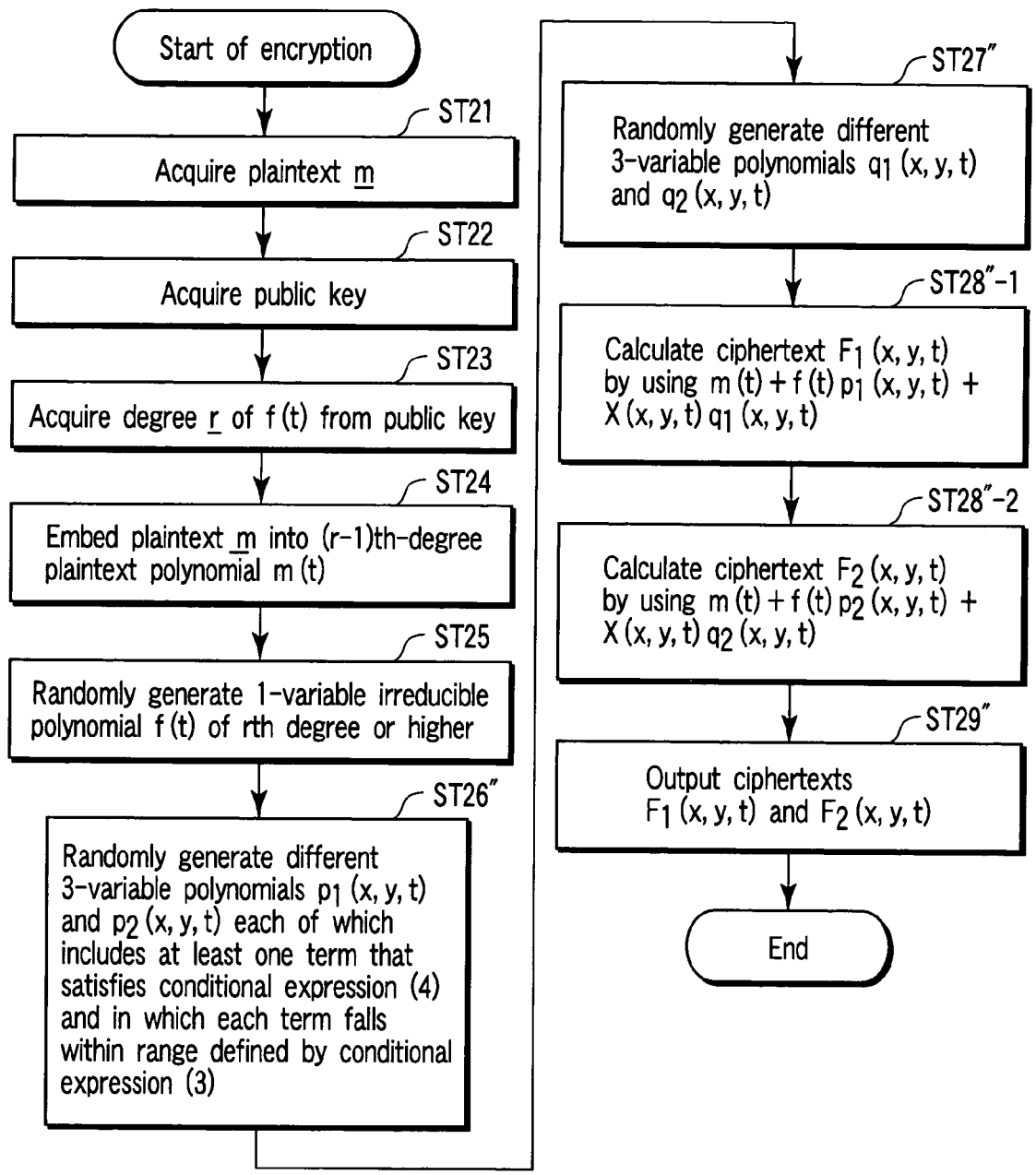
FIG. 14 is a flowchart for explaining the flow of processing in an encryption apparatus according to the second embodiment.

The arrangement of the encryption apparatus and the flow of processing according to this embodiment will be described with reference to the flowchart shown in FIG. 14 and the overall arrangement shown in FIG. 6. An encryption apparatus 20 starts the processing by acquiring a polynomial $\underline{m}$ from a plaintext input unit 21 and acquiring public keys $X(x, y, t)$, $\underline{p}$, $\underline{r}$, and $\underline{d}$ from a public key input unit 22. In this case, the public keys are the following which are obtained by key generation processing:

1. p=17
2. a fibration of an algebraic surface X on F17:

$$X(x, y, t): y^2+16x^3+16(t+1)x^2y+16(16t^2+14)x+16(t^2+3t+6)y+16(t^2+2)^2+(t+16)^3+(t+1)(t+16)^2(t^2+2)+(16t^2+14)(t+16)+(t^2+3t+6)(t^2+2)=0$$

3. lowest degree r=15 of a 1-variable irreducible polynomial f(t) on Fp
4. highest degree d=2 of polynomials $u_x(t)$ and $u_y(t)$ in a section First of all, the encryption apparatus 20 receives a plaintext from the plaintext input unit 21 (ST21), and receives public keys from the public key input unit 22 (ST22). At this time, of the public keys, r=15 which is the lowest degree of the 1-variable polynomial f(t) and characteristic p=17 are acquired by a plaintext embedding unit 23 (ST23).

The plaintext embedding unit 23 divides a plaintext $\underline{m}$ transmitted from the plaintext input unit 21 by a bit length smaller than the bit length of a characteristic $\underline{p}$ by one bit. For example, the plaintext "m=0xb25f04c792ef151" is divided every four bits, and the resultant values are embedded as coefficients of a plaintext polynomial m(t) as indicated by the following equation (ST24):

$$m(t)=11t^{14}+2\,t^{13}+5\,t^{12}+15t^{11}+0t^{10}+4t^9+12t^8+7t^7+9t^6+2t^5+14t^4+15t^3+t^2+5t+1$$

The plaintext embedding unit 23 transmits the plaintext polynomial m(t) to an encryption unit 24. The public key input unit 22 transmits the public keys to the encryption unit 24.

Upon receiving the plaintext polynomial and public keys, the encryption unit 24 transmits $\underline{r}$ and $\underline{p}$ of the public keys to a 1-variable irreducible polynomial generation unit 25. The 1-variable irreducible polynomial generation unit 25 randomly generates a 1-variable irreducible polynomial f(t) with a degree higher than the $\underline{r}$ degree (ST25), and sends back the obtained polynomial f(t) to the encryption unit 24.

In this case, the irreducible polynomial is generated by repeating irreducibility determination, as described above. Assume that the following polynomial f(t) is generated as a 15th-degree irreducible polynomial:

$$f(t)=t^{15}+13\,t^{14}+7\,t^{13}+8\,t^{12}+10t^9+t^8+5t^7+12t^6+7t^5+7t^4+2t^3+t^2+2t+7$$

Upon obtaining the 1-variable irreducible polynomial f(t), the encryption unit 24 transmits p to a polynomial generation unit 26. The polynomial generation unit 26 generates two different random 3-variable polynomials $p_1(x, y, t)$ and $p_2(x, y, t)$ in which each term satisfies inequality (3) and terms satisfying condition (4) (ST26"). In this case, for the sake of simplicity, $p_1(x, y, t)$ and $p_2(x, Y, t)$ are assumed to be the following:

$$p_1(x, y, t)=4x^4y^3+7x^3y^3+8x^3y^2+4x^2y^2+15x^3y+3xt^3+6x^2yt^2+8t+4$$

$$p_2(x, y, t)=3x^4y^3+10x^4y^2+11x^3y+10x^2y^3t+12xy^3t^3+13xy^2+14t^3+3t^2+7$$

Each term satisfies the degree relationship $((e_x+e_y)d+e_t<15)$ represented by inequality (3), and each equation includes a term that satisfies condition (4), i.e., $4x^4y^3$ and $3x^4y^3$. The polynomial generation unit 26 returns the generated 3-variable polynomials $p_1(x, y, t)$ and $p_2(x, y, t)$ to the encryption unit 24.

Upon obtaining the 3-variable polynomials $p_1(x, y, t)$ and $p_2(x, y, t)$, the encryption unit 24 transmits $\underline{p}$, $\underline{r}$, and $\underline{d}$ of the public keys to the polynomial generation unit 26 to make it generate two different random 3-variable polynomials $q_1(x, y, t)$ and $q_2(x, y, t)$ (ST27"). In this case, for the sake of simplicity, $q_1(x, y, t)$ and $q_2(x, y, t)$ are assumed to be the following:

$$q_1(x, y, t)=xy+y^2+3t^4+13t^3+4t^2+8t+4$$

$$q_2(x, y, t)=t^3xy+tx^2+4t^3+11t^2+7$$

The encryption unit 24 calculates and expands a ciphertext $F_1(x, y, t)$ by using m(t), f(t), $p_1(x, y, t)$, and $q_1(x, y, t)$ obtained by the above processing and the algebraic surface $X(x, y, t)$ as a public key according to equation (6) (ST28"-1). In this case, equation (6) is used with $p_1(x, y, t)$ and $q_1(x, y, t)$ replacing p(x, y, t) and q(x, y, t), respectively.

$F_1(x, y, t)$ is given as follows:

$$\begin{aligned}F_1(x, y, t)=&9+12x+5t^4x^3y^2+16x^2y^3t+9t^5x^2y+13tx^3y+\\&13t^{12}x^3y^2+7t^7x^3y+8t^6x^2y+t^{14}x^2y^2+7t^8x^3y^3+t^5xy+\\&13t^5x^3y+t^9xy+6t^7x^3y^2+10t^6x^3y+6t^9x^2y^2+9t^{11}x^2y+\\&4t^8x^4y^3+14t^6x^4y^3+11t^5x^2y^2+3t^7x^2y^2+7t^{15}x^3y^3+\\&10y+14y^2tx+12x^2yt^3+15t^{12}x^4y^3+8t^{14}x^3y+\\&8t^{15}x^3y^2+t^{14}x^4y^3+4t^8x^2y+16t^4xy+15t^{12}x^2y^2+\\&11t^4x^2y^2+3t^5x^3y+8t^8x^3y^2+5t^{12}x^3y^3+5t^{13}x^3y^2+\\&15t^2x^3y+14t^6x^2y^2+11t^6x^3y^2+3t^7x^4y^3+8t^{15}x^2y+\\&11t^5x^4y^3+15tx^3y^2+14t^7x^3y^3+t^7x^3y^3+15t^{13}x^3y^3+\\&16t^6x^3y^3+8t^7x^2y+t^{12}x^3y+7t^4x^2y+14t^8x^3y+3t^4x^3y+\\&13t^9x^2y+8tx^4y^3+2t^9x^3y^3+15t^7x^3y^3+4t^{15}x^4y^3+\\&6t^{10}x^2y+15t^{15}x^3y+4yt^3+14t^{14}x^2y+16t^3x^3y^2+\\&2t^{14}x^3y^2+t^5y^2+14y^3t+15t^2x^3y^3+11t^4x^4y^3+4t^2x^2y^2+\\&14x^2yt^2+8t^3x^4y^{3+4}t^3xy+14tx^3y^3+11t^{13}x^4y^3+9x^3t+\\&11x^2y^2+3x^3y+6t^{14}x^3y^3+15t^8x^3y+6t^{17}x^2y+3t^{13}x^3y+\\&11t^{13}x^2y^2+3x^3y^2+4txy+12t^9x^3y^2+2y^2t^4+5y^2t^2+\\&5t^5x^3y^2+6t^9x^4y^3+4t^{15}x^2y^2+8tx^2y^2+4t^8x^2y^2+\\&4t^2x^4y^3+14x^3t^4+13x^3t^2+4x^3t^3+y^4+y^3x+11x^4y^3+\\&7t^2x^3y^3+16y^2+12xy+16y^3t^2+16x^4y+12y^2t+14yt^6+\\&12yt^5+16x^2y^3+11t+3t^2+5x^2yt+13x^3+8t^2x^3y^2+\\&8t^3x^2y^2+8t^4+6t^3+9t^{13}+3t^{12}+15t^{11}+12t^{10}+15t^8+\\&7t^7+2t^6+4t^5+4t^9+6t^{15}+10t^{16}x^2y+15x^3y^3+11y^3+\\&16x^2y+3t^{18}x+5t^{17}x+4t^{16}x+7t^{15}x+13t^{12}x+3t^{11}x+\\&15t^{10}x+2t^9x+4t^8x+4t^7x+9t^6x+16t^5x+2xt^4+16xt^2+\\&16yt^2+8yt+14xy^2+7xt+7yt^4+8t^{16}\end{aligned}$$

The encryption unit 24 calculates and expands a ciphertext $F_2(x, y, t)$ by using m(t), f(t), $P_2(x, y, t)$, and $q_2(x, y, t)$ and the algebraic surface $X(x, y, t)$ as a public key (ST28"-2). $F_2(x, y, t)$ is given as follows:

$$\begin{aligned}F_2(x, y, t)=&15+4x+16t^4x^3y^2+2x^2y^3t+t^5x^2y+5tx^3y+\\&4t^7x^3y+2t^{12}xy^2+11t^{15}xy^3+12t^{13}x^2y^3+12t_{12}x^4y^2+\\&6t^{13}xy^2+16t^{16}xy^3+2t^{14}x^2y^3+2t^{13}x^4y^2+16t^{14}xy^2+3\\&t^{17}xy^3+11t^{15}x^2y^3+11t^{14}x^4y^2+13t^{15}xy^2+12t^{18}xy^3+\\&10t^{16}x^2y^3+10t^{15}x^4y^2+t^5xy+5t^3x^3y+7xy^3t^4+\\&3x^2y^3t^2+12t^6xy^3+13t^6x^3y+10t^3x^2y^3+11^2x^4y^2+\\&3t^3xy^2+7t^6xy^3+3t^4x^2y^3+3t^3x^4y^2+3t^4xy^2+3t^8x^4y^3+\\&16t^7xy^3+2t^5x^2y^3+2t^6x^4y^3+2t^4x^4y^2+5t^5xy^2+\\&16t^8xy^3+2t^6x^2y^3+2t^5x^4y^2+3t^6xy^2+8t^8xy^3+t^7x^2y^3+\\&t^6x^4y^2+14t^7xy^2+9t^{10}xy^3+16t^8x^2y^3+16t^7x^4y^2+\\&13t^8xy^2+12t^{11}xy^3+10t^9x^2y^3+10t^8x^4y^2+11t^9xy^2+\end{aligned}$$

$t^{12}xy^3+15t^{10}x^2y^3+15t^9x^4y^2+9y+2x^4y^2+3tx^4y^2+$
$9y^2tx+16x^4yt+t^8xy+4t^6xy+4x^2yt^3+7t^{12}x^4y^3+$
$7t^{14}x^3y+16t^7xy+16x^4t^3y+16x^4yt^2+5t^{14}x^4y^3+$
$4t^4xy+9t^5x^3y+11t^2x^3y+15t^7x^4y^3+4t^5x^4y^3+3t^{12}x^3y+$
$13t^4x^2y+8t^9x^3y+9t^4x^3y+6tx^4y^3+12xt^3+13xt^2y^2+$
$3t^{15}x^4y^3+11t^{15}x^3y+11yt^3+16t^3x^3y^2+4t^4x^4y^3+$
$3x^2yt^2+6t^3x^4y^3+12t^3xy+4t^{13}x^4y^3+3x^3t+9x^3y+$
$11t^8x^3y+9t^{13}x^3y+16x^5t+4x^2t^2+t^3x^2+16t^5x^2+4t^4x^2+$
$t^6x^2+14t^{18}+15t^{17}+11y^2t^2+4y^2t^3+13t^9x^4y^3+tx^2y^2+$
$3t^2x^4y^3+6x^3t^2+14x^3t^3+4x^4y^3+7y^2+12x^2t+$
$13yt^{5+13}t+15t^2+4x^2yt+10x^3+12t^4+15t^3+7t^{14}+$
$14t^{12}+8t^{11}+5t^{10}+4t^8+15t^7+11t^6+7t^5+2t^9+4t^{15}+$
$10x^2y+4t^5x+11xt^4+6xt^2+12yt^2+13yt+6xy^2+11yt^4+$
$t^{16}$

The encryption unit 24 modifies the ciphertexts $F_1(x, y, t)$ and $F_2(x, y, t)$ in accordance with a predetermined format as needed and outputs the modified ciphertexts from a ciphertext output unit 27 (ST29"). The encryption processing is then terminated.

When the second variation is applied to the encryption apparatus 20 of this embodiment, since the degree conditions of $p_1(x, y, t)$ and $p_2(x, y, t)$ are eliminated, $p_1(x, y, t)$ and $p_2(x, y, t)$ can be generated by the same method as that for $q_1(x, y, t)$ and $q_2(x, y, t)$.

The third variation is spontaneously realized with respect to the encryption processing of this embodiment. The fourth variation is realized in the same manner as this embodiment. In this case, the plaintext embedding unit 23 divides the plaintext m into blocks by the same method as that in this embodiment, and embeds the respective blocks into the coefficients of m(t) and some predetermined coefficients of f(t). Thereafter, it suffices if the 1-variable irreducible polynomial generation unit 25 randomly sets the remaining coefficients of f(t).

The sixth variation is realized as it is, if there is newly added the processing of generating the new plaintext m' by causing the plaintext embedding unit 23 to convert the plaintext into equation (vari 6) by using the predetermined hash function h.

(Decryption Apparatus and Flow of Processing)

Figure 15:
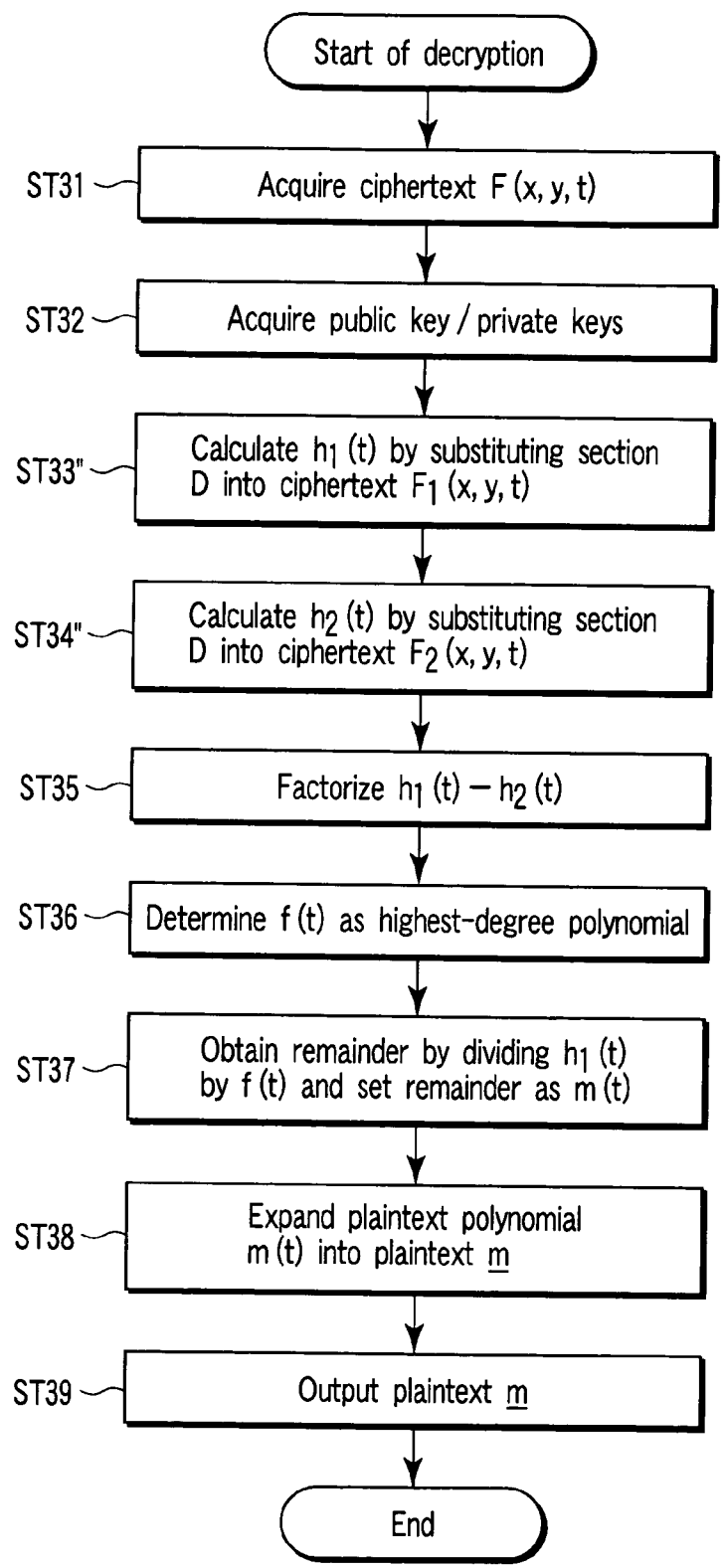
FIG. 15 is a flowchart for explaining the flow of processing in a decryption apparatus according to the second embodiment.

Lastly, the arrangement of the decryption apparatus and the flow of processing according to this embodiment will be described below with reference to the overall arrangement shown in FIG. 8 and the flowchart shown in FIG. 15. A decryption apparatus 30 acquires a ciphertext F(x, y, t) from a ciphertext input unit 31 (ST31), and acquires public keys X(x, y, t), p, r, and d and a private key from a key input unit 32 (ST32), thereby starting the processing. The private key is one section D indicated in equation (18) described in key generation. The acquired ciphertext, public keys, and private key are sent to a decryption unit 33 to start decryption processing.

The decryption unit 33 transmits the ciphertexts $F_1(x, y, t)$ and $F_2(x, y, t)$ and section D to a section substitution unit 34. The section substitution unit 34 obtains $h_1(t)$ given below by substituting D into $F_1(x, y, t)$ and using a polynomial computing unit 35 as needed (ST33"):

$$h_1(t) = F_1(u_x(t), u_y(t), t)$$
$$= 15 + 5t^{18} + t^{17} + 3t^{19} + 9t^{24} + 7t^{22} + 12t^{20} + 6t^{23} +$$
$$7t^{21} + 12t + 3t^2 + 4t^{25} + 4t^4 + 12t^3 + 12t^{14} + 11t^{13} +$$
$$9t^{12} + 12t^{11} + 5t^{10} + 14t^8 + 11t^7 + 8t^6 + 5t^5 + 3t^9 +$$
$$10t^{15} + 15t^{16}$$

In this case, the polynomial computing unit 35 performs addition, subtraction, multiplication, and division with respect to 1-variable polynomials. The section substitution unit 34 obtains $h_2(t)$ given below by substituting the section $D_2$ into F(x, y, t) in the same manner (ST34"):

$$h_2(t) = F_2(u_x(t), u_y(t), t)$$
$$= 14 + 11t^{18} + 3t^{17} + 16t^{19} + 11t^{24} + 14t^{22} + 9t^{20} +$$
$$4t^{23} + 6t^{21} + t + 12t^2 + 15t^{25} + 11t^3 + 7t^{14} + 6t^{13} +$$
$$3t^{12} + 12t^{11} + 13t^{10} + 6t^8 + 8t^7 + 9t^6 + 5t^5 +$$
$$14t^9 + 10t^{15} + 5t^{16}$$

Obtained $h_1(t)$ and $h_2(t)$ are sent out from the section substitution unit 34 to the decryption unit 33. The decryption unit 33 transmits $h_1(t)$ and $h_2(t)$ to the polynomial computing unit 35 and makes it subtract them from each other. The decryption unit 33 then transmits the result to a factorization unit 36 to make it perform factorization (ST35), thereby obtaining the factorization result represented by equation (19):

$$h_1(t)-h_2(t)=6(t+9)\,(t^3+16t^2+2t+6)\,(t^2+14t+12)\,(t^4+ \\ 10t^3+11t^2+11t+16)(t^{15}+13t^{14}+7t^{13}+8t^{12}+10t^9+t^8+ \\ 5t^7+12t^6+7t^5+7t^4+2t^3+t^2+2t+7) \quad (19)$$

In this case, an irreducible polynomial f(t) appears as a highest-degree factor. The decryption unit 33 transmits the right side of equation (19) which is a factorization result to the polynomial extraction unit 37 to make it extract f(t) as a factor having the highest degree (ST36). The decryption unit 33 sends f(t) and $h_1(t)$ to a remainder computing unit 38. The remainder computing unit 38 divides $h_1(t)$ by f(t) to calculate a plaintext polynomial m(t) as the remainder given below (ST37), and transmits the obtained polynomial m(t) to the decryption unit 33.

$$m(t)=11t^{14}+2t^{13}+5t^{12}+15t^{11}+4t^9+12t^8+7t^7+9t^6+2t^5+ \\ 14t^4+15t^3+t^2+5t+1$$

The decryption unit 33 transmits m(t) to a plaintext expansion unit 39. The plaintext expansion unit 39 expands m(t) to obtain plaintext m=0xb25f04c792ef151 (ST38). The plaintext expansion unit 39 outputs the plaintext m from the plaintext output unit 40 (ST39). With this operation, the decryption apparatus 30 terminates the decryption processing.

Figure 16:
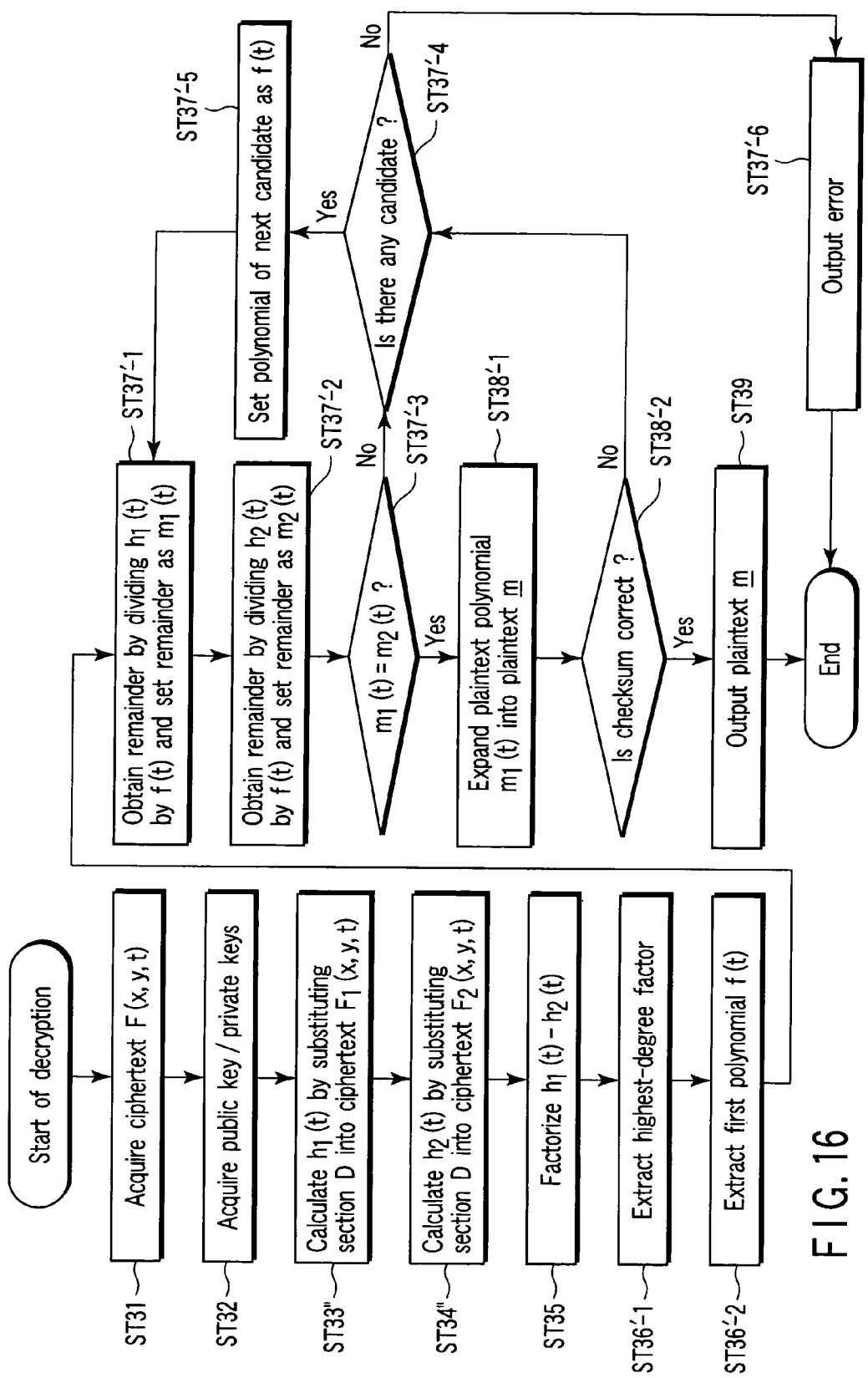
FIG. 16 is a flowchart for explaining the flow of processing in the second variation of the decryption apparatus according to the second embodiment.

Note that FIG. 10 shows the overall arrangement of the decryption apparatus 30 according to the second variation which has been referred to in the first embodiment, and FIG. 16 shows an algorithm for decryption processing. The second variation of the second embodiment is an obvious modification of the first embodiment (ST33", ST34", and the like), and hence a detailed description thereof will be omitted.

The third variation is spontaneously realized even in the second embodiment. The fourth variation is also realized in the second embodiment by sending f(t) obtained during decryption processing as part of a plaintext to the plaintext expansion unit 39 and making it expand the plaintext m by combining m(t) and f(t). The fifth variation can be realized by applying, to each verifying operation, the verification method to be applied to a case wherein there are a plurality of candidates for f(t) in the second variation of this embodiment (or the first embodiment).

The sixth variation can be realized by causing the plaintext expansion unit 39 to expand the plaintext m' in the same manner as in this embodiment, and checking (by using a predetermined hash function h) whether or not the obtained plaintext m' satisfies equation (vari 6). If the check result indicates that the plaintext is not correct, an error is output. If the plaintext is correct, the obtained message m is transmitted to a plaintext output unit 40. Note that this variation can be used together with the third variation. In addition, this variation can be used together with the second variation by, for example, executing a check based on equation (vari 6) as checksum operation.

This is the end of the description of the detailed arrangements of the key generation apparatus 10, encryption apparatus 20, and decryption apparatus 30 according to the second embodiment of the present invention.

As described above, according to this embodiment, although one section D is used as a private key, the encryption apparatus 20, decryption apparatus 30, or key generation apparatus 10 based on the public-key cryptographic scheme whose security is based on the divisor finding problem as in the first embodiment are realized. This makes it possible to create a public-key cryptographic scheme which can ensure security even in the advent of a quantum computer, can be securely realized even by current computers, and can be realized under a low-power environment as in the first embodiment.

Since it suffices if the second embodiment is designed to satisfy one section D unlike the first embodiment, the second embodiment can generate a key with a high degree of freedom more easily than the first embodiment.

The technology described in relation to the above embodiments can be embodied as a program executable by a computer. The program can be distributed to people after being stored in recording mediums, including a magnetic disk (e.g., a floppy disk or a hard disk), an optical disk (e.g., a CD-ROM or a DVD), a magneto-optical disk (MO) or a semiconductor memory.

The recording mediums can use any recording format as long as they can store a program and are readable by a computer.

An OS (Operating System) which a computer executes on the basis of a program installed on a computer from a recording medium, MW (middleware) such as database management software, network software, etc. may be part of the processing that realizes the present embodiment.

Moreover, a recording medium used in the present invention is not limited to a medium that is independent of a computer; it may be any kind of recording medium as long as it can store or temporarily store a program downloaded from a LAN or the Internet.

Two or more recording mediums may be used. In other words, the present invention covers the case where the processing of the embodiment is executed by use of two or more recording mediums. It should be also noted that the recording mediums may be of any structure as long as they fulfill the functions required.

The computer used in the present invention executes the processing on the basis of the program stored in a storage medium. As long as this function is satisfied, the computer may be of any structure. It may be a single personal computer, a system wherein a plurality of apparatuses are connected as a network, etc.

The computer used in the present invention is not limited to a personal computer; it may be an operation executing apparatus, a microcomputer or the like that is included in an information processing apparatus. The concept "computer" used in the present invention is intended to mean any kind of apparatus or device that can achieve the functions of the present invention on the basis of a program.

The present invention is not limited to the above-described embodiments. Accordingly, in practicing the invention, various modifications of constituent elements can be made without departing from its spirit or scope. In addition, various inventions can be formed by appropriately combining a plurality of constituent elements disclosed in the embodiments. For example, some constituent elements may be omitted from those described in the embodiments. Alternatively, constituent elements of different embodiments may appropriately be combined.

For example, each embodiment described above has exemplified the key generation apparatus 10, encryption apparatus 20, and decryption apparatus 30 as different apparatuses. However, the present invention is not limited to this. For example, of the apparatuses 10, 20, and 30, the encryption apparatus 20 and decryption apparatus 30 may be combined into an encryption/decryption apparatus, or the key generation apparatus 10 and decryption apparatus 30 may be combined into a decryption apparatus with a key generation function. In this manner, two arbitrary apparatuses may be combined. Alternatively, the three apparatuses may be combined.

What is claimed is:

1. An encryption apparatus for encrypting a message m on the basis of a fibration $X(x, y, t)=0$ of an algebraic surface X which is a public key, the public key corresponding to private keys, the private keys for decryption being two or more sections corresponding to the fibration $X(x, y, t)$ of the algebraic surface X, the encryption apparatus comprising:

a plaintext embedding device executed by a processor and configured to embed the message m as coefficients of a plaintext polynomial m(t) with a degree not higher than a degree (r−1);

a first polynomial generation device executed by the processor and configured to generate random polynomials $p(x, y, t)$ and $q(x, y, t)$ each having three variables x, y, and t;

a second polynomial generation device executed by the processor and configured to generate a random 1-variable irreducible polynomial f(t) with a degree not lower than a degree r; and a ciphertext generation device executed by the processor and configured to generate ciphertext $F=E_{pk}(m, p, q, f, X)$ from the plaintext polynomial m(t) by encryption processing of performing computation including at least one of addition, subtraction, and multiplication of the polynomials $p(x, y, t)$, $q(x, y, t)$, and f(t) and the defining equation $X(x, y, t)$ with respect to the plaintext polynomial m(t);

wherein the plaintext embedding device separately embeds the message m in the coefficients of the plaintext polynomial m(t) with one variable t and a degree not higher than the degree (r−1) and some coefficients of a candidate for the 1-variable irreducible polynomial f(t), and the second polynomial generation device generates the 1-variable irreducible polynomial f(t) by setting, to a random value, a coefficient of the coefficients of the candidate for the 1-variable irreducible polynomial f(t) in which the message m is not embedded.

2. An encryption apparatus for encrypting a message m on the basis of a fibration $X(x, y, t)=0$ of an algebraic surface X which is a public key, the public key corresponding to private keys, the private keys for decryption being one section corresponding to the fibration $X(x, y, t)$ of the algebraic surface X, the encryption apparatus comprising:

a plaintext embedding device executed by a processor and configured to embed the message m as coefficients of a plaintext polynomial m(t) with a degree not higher than a degree (r−1);

a polynomial generation device executed by the processor and configured to generate two pairs of random polynomials $q_1(x, y, t)$ and $q_2(x, y, t)$, and $p_1(x, y, t)$ and $p_2(x, y, t)$ each having three variables x, y, and t;

a 1-variable irreducible polynomial generation device executed by the processor and configured to generate a random 1-variable irreducible polynomial $f(t)$ with a degree not lower than a degree r; and a ciphertext generation device executed by the processor and configured to generate a plurality of ciphertexts $F_1 = E_{pk}(m, p_1, q_1, f, X)$ and $F_2 = E_{pk}(m, p_2, q_2, f, X)$ from the plaintext polynomial $m(t)$ by encryption processing of performing computation including at least one of addition, subtraction, and multiplication of the 1-variable irreducible polynomial $f(t)$, the two pairs of polynomials $q_1(x, y, t)$ and $q_2(x, y, t)$, and $p_1(x, y, t)$ and $p_2(x, y, t)$, and the fibration $X(x, y, t)$ of the algebraic surface X which is opened to the public;

wherein the plaintext embedding device separately embeds the message m in the coefficients of the plaintext polynomial $m(t)$ with one variable t and a degree not higher than the degree $(r-1)$ and some coefficients of a candidate for the 1-variable irreducible polynomial $f(t)$, and the 1-variable irreducible polynomial generation device generates the 1-variable irreducible polynomial $f(t)$ by setting, to a random value, a coefficient of the coefficients of the candidate for the 1-variable irreducible polynomial $f(t)$ in which the message m is not embedded.

3. A decryption apparatus for decrypting a message m from ciphertext $F = E_{pk}(m, p, q, f, X)$ on the basis of two sections $D_1$ and $D_2$ which are private keys to be held in advance and correspond to a fibration $X(x, y, t) = 0$ of an algebraic surface X, in inputting the ciphertext F which is generated from a plaintext polynomial $m(t)$ in which the message m is embedded as coefficients of a plaintext polynomial $m(t)$ with one variable t and a degree not higher than a degree $(r-1)$ by encryption processing of performing computation including at least one of addition, subtraction, and multiplication of random polynomials $p(x, y, t)$ and $q(x, y, t)$ each having three variables x, y, and t, a 1-variable irreducible polynomial $f(t)$ with a degree not lower than a degree r, and the fibration $X(x, y, t)$ of the algebraic surface X which is a public key with respect to the plaintext polynomial $m(t)$, the decryption apparatus comprising:

a section substituting device executed by a processor and configured to substitute the sections $D_1$ and $D_2$ into the input ciphertext F to generate two 1-variable polynomials $h_1(t)$ and $h_2(t)$;

a polynomial subtraction device executed by the processor and configured to subtract the 1-variable polynomials $h_1(t)$ and $h_2(t)$ from each other to obtain a subtraction result $\{h_1(t) - h_2(t)\}$;

a factorization device executed by the processor and configured to factorize the subtraction result $\{h_1(t) - h_2(t)\}$;

a polynomial extraction device executed by the processor and configured to extract an irreducible polynomial $f(t)$ having a highest degree from the factorization result; and a remainder computing device executed by the processor and configured to compute a remainder by dividing the 1-variable polynomial $h_1(t)$ by the irreducible polynomial $f(t)$ to obtain a plaintext polynomial $m(t)$ as the remainder;

wherein the message m is separately embedded in the coefficients of the plaintext polynomial $m(t)$ with one variable t and degree not higher than the degree $(r-1)$ and some coefficients of the 1-variable irreducible polynomial $f(t)$ with a degree not lower than the degree r, and which further comprises a plaintext expanding device configured to expand the plaintext polynomial $m(t)$ obtained by the remainder computing device and the irreducible polynomial $f(t)$ extracted by the polynomial extraction device to obtain the message m.

4. A decryption apparatus for decrypting a message m from a plurality of ciphertexts $F_1 = E_{pk}(m, p_1, q_1, f, X)$ and $F_2 = E_{pk}(m, p_2, q_2, f, X)$ on the basis of one section D which is private keys to be held in advance and corresponds to a fibration $X(x, y, t) = 0$ of an algebraic surface X, in inputting the ciphertexts $F_1$ and $F_2$ which are generated from a plaintext polynomial $m(t)$ in which the message m is embedded as coefficients of a plaintext polynomial $m(t)$ with one variable t and a degree not higher than a degree $(r-1)$ by encryption processing of performing computation including at least one of addition, subtraction, and multiplication of a random 1-variable irreducible polynomial $f(t)$ with a degree not lower than a degree r, two pairs of random polynomials $q_1(x, y, t)$ and $q_2(x, y, t)$, and $p_1(x, y, t)$ and $p_2(x, y, t)$ at least one pair of which are different from each other, and the fibration $X(x, y, t)$ of the algebraic surface X which is opened to the public with respect to the plaintext polynomial $m(t)$, the decryption apparatus comprising:

a section substituting device executed by a processor and configured to substitute the section D into the two input ciphertexts $F_1$ and $F_2$ to generate two 1-variable polynomials $h_1(t)$ and $h_2(t)$;

a polynomial subtraction device executed by the processor and configured to subtract the 1-variable polynomials $h_1(t)$ and $h_2(t)$ from each other to obtain a subtraction result $\{h_1(t) - h_2(t)\}$;

a factorization device executed by the processor and configured to factorize the subtraction result $\{h_1(t) - h_2(t)\}$;

a polynomial extraction device executed by the processor and configured to extract an irreducible polynomial $f(t)$ having a highest degree from the factorization result; and a remainder computing device executed by the processor and configured to compute a remainder by dividing the 1-variable polynomial $h_1(t)$ by the irreducible polynomial $f(t)$ to obtain a plaintext polynomial $m(t)$ as the remainder;

wherein the message m is separately embedded in the coefficients of the plaintext polynomial $m(t)$ with one variable t and a degree not higher than the degree $(r-1)$ and some coefficients of the 1-variable irreducible polynomial $f(t)$ with a degree not lower than the degree r;

which further comprises a plaintext expanding device configured to expand the plaintext polynomial $m(t)$ obtained by the remainder computing device and the irreducible polynomial $f(t)$ extracted by the polynomial extraction device to obtain the message m;

a second remainder computing device configured to compute a remainder by dividing the 1-variable polynomial $h_2(t)$ by the irreducible polynomial $f(t)$ to obtain a plaintext polynomial $m(t)$ as the remainder; and a verification device configured to verify that the two plaintext polynomials $m(t)$ obtained by the respective remainder computing devices coincide with each other, by comparing the plaintext polynomials.

5. A key generation apparatus for generating a fibration $X(x, y, t)$ of an algebraic surface X which is a public key for encrypting a message m and two sections $D_1$ and $D_2$ which are private keys for decrypting the encrypted message m and correspond to the fibration $X(x, y, t) = 0$ of the algebraic surface X, the key generation apparatus comprising:

a first polynomial generation device executed by a processor and configured to generate a random 1-variable polynomial $\lambda_x(t)$;

a second plaintext generation device executed by the processor and configured to generate a 1-variable polynomial $\lambda_y(t)$ which is divisible by the 1-variable polynomial $\lambda_x(t)$;

a third polynomial generation device executed by the processor and configured to generate two 1-variable polynomials $u_x(t)$ and $v_x(t)$ each indicating a variable x with a parameter t on the basis of the 1-variable polynomial $\lambda_x(t)$ so as to make a difference $\{u_x(t)-v_x(t)\}$ between the two 1-variable polynomials become equal to $\lambda_x(t)$;

a fourth polynomial generation device executed by the processor and configured to generate two 1-variable polynomials $u_y(t)$ and $v_y(t)$ each indicating a variable y with a parameter t on the basis of the 1-variable polynomial $\lambda_y(t)$ so as to make a difference $\{u_y(t)-v_y(t)\}$ between the two 1-variable polynomials become equal to $\lambda_y(t)$;

a section generation device executed by the processor and configured to generate the two sections $D_1:(x, y, t)=(u_x(t), u_y(t), t)$ and $D_2:(x, y, t)=(v_x(t), v_y(t), t)$ on the basis of the 1-variable polynomials $u_x(t)$, $v_x(t)$, $u_y(t)$, and $v_y(t)$; and a fibration generation device executed by the processor and configured to generate a fibration $X(x, y, t)$ of the algebraic surface X which has the sections $D_1$ and $D_2$.

6. A key generation apparatus for generating a fibration $X(x, y, t)$ of an algebraic surface X which is a public key for encrypting a message m and a section D which is a private key for decrypting the encrypted message m and corresponds to the fibration $X(x, y, t)=0$ of the algebraic surface X, the key generation apparatus comprising:

a polynomial generation device executed by a processor and configured to generate a random 1-variable polynomial $\xi_i(t)$ (where i is a natural number);

a polynomial generation device executed by the processor and configured to generate two 1-variable polynomials $u_x(t)$ and $u_y(t)$ which indicate variables x and y of the algebraic surface with a parameter t;

a section generation device executed by the processor and configured to generate the section $D:(x, y, t)=(u_x(t), u_y(t), t)$ on the basis of the 1-variable polynomials $u_x(t)$ and $u_y(t)$; and a fibration generation device executed by the processor and configured to generate a fibration $X(x, y, t)$ of the algebraic surface X which has the section D on the basis of the 1-variable polynomials $\xi_i(t)$ and the section D.

7. A computer-readable storage medium used in an encryption apparatus and including computer executable instructions for encrypting a message m on the basis of a fibration $X(x, y, t)=0$ of an algebraic surface X which is a public key, the public key corresponding to private keys, the private keys for decryption being two or more sections corresponding to the fibration $X(x, y, t)$ of the algebraic surface X, the computer readable storage medium comprising:

first computer executable instructions which cause a computer to sequentially execute a process of embedding the message m as coefficients of a plaintext polynomial m(t) with a degree not higher than a degree (r−1);

second computer executable instructions which cause the computer to sequentially execute a process of generating random polynomials p(x, y, t) and q(x, y, t) each having three variables x, y, and t;

third computer executable instructions which cause the computer to sequentially execute a process of generating a random 1-variable irreducible polynomial f(t) with a degree not lower than a degree r; and fourth computer executable instructions which cause the computer to sequentially execute a process of generating ciphertext $F=E_{pk}(m, p, q, f, X)$ from the plaintext polynomial m(t) by encryption processing of performing computation including at least one of addition, subtraction, and multiplication of the polynomials p(x, y, t), q(x, y, t), and f(t) and the defining equation $X(x, y, t)$ with respect to the plaintext polynomial m(t);

wherein the first computer executable instructions cause the computer to sequentially execute a process of separately embedding the message m in the coefficients of the plaintext polynomial m(t) with one variable t and a degree not higher than the degree (r−1) and some coefficients of a candidate for the 1-variable irreducible polynomial f(t), and the third computer executable instructions cause the computer to sequentially execute a process of generating the 1-variable irreducible polynomial f(t) by selling, to a random value, a coefficient of the coefficients of the candidate for the 1-variable irreducible polynomial f(t) in which the message m is not embedded.

8. A computer-readable storage medium used in an encryption apparatus and including computer executable instructions for encrypting a message m on the basis of a fibration $X(x, y, t)=0$ of an algebraic surface X which is a public key, the public key corresponding to a private key, the private key for decryption being one section corresponding to the fibration $X(x, y, t)$ of the algebraic surface X, the computer readable storage medium comprising:

first computer executable instructions which cause a computer to sequentially execute a process of embedding the message m as coefficients of a plaintext polynomial m(t) with a degree not higher than a degree (r−1);

second computer executable instructions which cause the computer to sequentially execute a process of generating two pairs of random polynomials $q_1(x, y, t)$ and $q_2(x, y, t)$, and $p_1(x, y, t)$ and $p_2(x, y, t)$ each having three variables x, y, and t;

third computer executable instructions which cause the computer to sequentially execute a process of generating a random 1-variable irreducible polynomial f(t) with a degree not lower than a degree r; and fourth computer executable instructions which cause the computer to sequentially execute a process of generating a plurality of ciphertexts $F_1=E_{pk}(m, p_1, q_1, f, X)$ and $F_2=E_{pk}(m, p_2, q_2, f, X)$ from the plaintext polynomial m(t) by encryption processing of performing computation including at least one of addition, subtraction, and multiplication of the 1-variable irreducible polynomial f(t), the two pairs of polynomials $q_1(x, y, t)$ and $q_2(x, y, t)$, and $p_1(x, y, t)$ and $p_2(x, y, t)$, and the fibration $X(x, y, t)$ of the algebraic surface X which is opened to the public;

wherein the first computer executable instructions cause the computer to sequentially execute a process of separately embedding the message m in the coefficients of the plaintext polynomial m(t) with one variable t and a degree not higher than the degree (r−1) and some coefficients of a candidate for the 1-variable irreducible polynomial f(t), and the third computer executable instructions cause the computer to sequentially execute a process of generating the 1-variable irreducible polynomial f(t) by selling, to a random value, a coefficient of the coefficients of the candidate for the 1-variable irreducible polynomial f(t) in which the message m is not embedded.

9. A computer-readable storage medium used in a decryption apparatus and including computer executable instructions for decrypting a message m from a ciphertext $F=E_{pk}(m, p, q, f, X)$ on the basis of two sections $D_1$ and $D_2$ which are private keys to be held in advance and correspond to a fibration $X(x, y, I)=0$ of an algebraic surface X, in inputting the ciphertext F which is generated from a plaintext polynomial m(t) in which the message m is embedded as coefficients of a plaintext polynomial m(t) with one variable t and a degree not higher than a degree (r−1) by encryption processing of performing computation including at least one of addition, subtraction, and multiplication of random polynomials $p(x, y, t)$ and $q(x, y, t)$ each having three variables x, y, and t, a 1-variable irreducible polynomial f(t) with a degree not lower than a degree r, and the fibration $X(x, y, t)$ of the algebraic surface X which is a public key with respect to the plaintext polynomial m(t), the computer readable storage medium comprising:

first computer executable instructions which cause a computer to sequentially execute a process of substituting the sections $D_1$ and $D_2$ into the input ciphertext F to generate two 1-variable polynomials $h_1(t)$ and $h_2(t)$;

second computer executable instructions which cause the computer to sequentially execute a process of subtracting the 1-variable polynomials $h_1(t)$ and $h_2(t)$ from each other to obtain a subtraction result $\{h_1(t)-h_2(t)\}$;

third computer executable instructions which cause the computer to sequentially execute a process of factorizing the subtraction result $\{h_1(t)-h_2(t)\}$;

fourth computer executable instructions which cause the computer to sequentially execute a process of extracting an irreducible polynomial f(t) having a highest degree from the factorization result; and fifth computer executable instructions which cause the computer to sequentially execute a process of computing a remainder by dividing the 1-variable polynomial $h_1(t)$ by the irreducible polynomial f(t) to obtain a plaintext polynomial m(t) as the remainder;

wherein the message m is separately embedded in the coefficients of the plaintext polynomial m(t) with one variable t and a degree not higher than the degree (r−1) and some coefficients of the 1-variable irreducible polynomial f(t) with a degree not lower than the degree r, and further comprising which further comprises sixth computer executable instructions which cause the computer to sequentially execute a process of expanding the plaintext polynomial m(t) obtained by execution of the fifth computer executable instructions and the irreducible polynomial f(t) extracted by execution of the fourth computer executable instructions to obtain the message m.

10. A computer-readable storage medium used in a decryption apparatus and including computer executable instructions for decrypting a message m from a plurality of ciphertexts $F_1=E_{pk}(m, p_1, q_1, f, X)$ and $F_2=E_{pk}(m, p_2, q_2, f, X)$ on the basis of one section D which is a private key to be held in advance and corresponds to a fibration $X(x, y, t)=0$ of an algebraic surface X, in inputting the ciphertexts $F_1$ and $F_2$ which are generated from a plaintext polynomial m(t) in which the message m is embedded as coefficients of a plaintext polynomial m(t) with one variable t and a degree not higher than a degree (r−1) by encryption processing of performing computation including at least one of addition, subtraction, and multiplication of a random 1-variable irreducible polynomial f(t) with a degree not lower than a degree r, two pairs of random polynomials $q_1(x, y, t)$ and $q_2(x, y, t)$, and $p_1(x, y, t)$ and $p_2(x, y, t)$ at least one pair of which are different from each other, and the fibration $X(x, y, t)$ of the algebraic surface X which is opened to the public with respect to the plaintext polynomial m(t), the computer readable storage medium comprising:

first computer executable instructions which cause a computer to sequentially execute a process of substituting the section D into the two input ciphertexts $F_1$ and $F_2$ to generate two 1-variable polynomials $h_1(t)$ and $h_2(t)$;

second computer executable instructions which cause the computer to sequentially execute a process of subtracting the 1-variable polynomials $h_1(t)$ and $h_2(t)$ from each other to obtain a subtraction result $\{h_1(t)-h_2(t)\}$;

third computer executable instructions which cause the computer to sequentially execute a process of factorizing the subtraction result $\{h_1(t)-h_2(t)\}$;

fourth computer executable instructions which cause the computer to sequentially execute a process of extracting an irreducible polynomial f(t) having a highest degree from the factorization result; and fifth computer executable instructions which cause the computer to sequentially execute a process of computing a remainder by dividing the 1-variable polynomial $h_1(t)$ by the irreducible polynomial f(t) to obtain a plaintext polynomial m(t) as the remainder;

wherein the message m is separately embedded in the coefficients of the plaintext polynomial m(t) with one variable t and a degree not higher than the degree (r−1) and some coefficients of the 1-variable irreducible polynomial f(t) with a degree not lower than the degree r, and which further comprises sixth computer executable instructions which cause the computer to sequentially execute a process of expanding the plaintext polynomial m(t) obtained by execution of the fifth computer executable instructions and the irreducible polynomial f(t) extracted by execution of the fourth computer executable instructions to obtain the message m;

seventh computer executable instructions which cause the computer to sequentially execute a process of computing a remainder by dividing the 1-variable polynomial $h_2(t)$ by the irreducible polynomial f(t) to obtain a plaintext polynomial m(t) as the remainder; and eighth computer executable instructions which cause the computer to sequentially execute a process of verifying that the two plaintext polynomials m(t) obtained by execution of the fifth computer executable instructions and seventh computer executable instructions coincide with each other, by comparing the plaintext polynomials.

11. A computer-readable storage medium used in a key generation apparatus and including computer executable instructions for generating a fibration $X(x, y, t)$ of an algebraic surface X which is a public key for encrypting a message m and two sections $D_1$ and $D_2$ which are private keys for decrypting the encrypted message m and correspond to fibration $X(x, y, t)=0$ of the algebraic surface X, the computer readable storage medium comprising:

first computer executable instructions which cause the computer to sequentially execute a process of generating a random 1-variable polynomial $\lambda_x(t)$;

second computer executable instructions which cause the computer to sequentially execute a process of generating a 1-variable polynomial $\lambda_y(t)$ which is divisible by the 1-variable polynomial $\lambda_x(t)$;

third computer executable instructions which cause the computer to sequentially execute a process of generating two 1-variable polynomials $u_x(t)$ and $v_x(t)$ each indicating a variable x with a parameter t on the basis of the 1-variable polynomial $\lambda_x(t)$ so as to make a difference $\{u_x(t)-v_x(t)\}$ between the two 1-variable polynomials become equal to $\lambda_x(t)$;

fourth computer executable instructions which cause the computer to sequentially execute a process of generating two 1-variable polynomials $u_y(t)$ and $v_y(t)$ each indicating a variable y with a parameter t on the basis of the 1-variable polynomial $\lambda_y(t)$ so as to make a difference $\{u_y(t)-v_y(t)\}$ between the two 1-variable polynomials become equal to $\lambda_y(t)$;

fifth computer executable instructions which cause the computer to sequentially execute a process of generating the two sections $D_1:(x, y, t)=(u_x(t), u_y(t), t)$ and $D_2:(x, y, t)=(v_x(t), v_y(t), t)$ on the basis of the 1-variable polynomials $u_x(t)$, $v_x(t)$, $u_y(t)$, and $v_y(t)$; and sixth computer executable instructions which cause the computer to sequentially execute a process of generating a fibration $X(x, y, t)$ of the algebraic surface X which has the sections $D_1$ and $D_2$.

12. A computer-readable storage medium used in a key generation apparatus and including computer executable instructions for generating a fibration $X(x, y, t)$ of an algebraic surface X which is a public key for encrypting a message m and a section D which is a private key for decrypting the encrypted message m and corresponds to the fibration $X(x, y, t)=0$ of the algebraic surface X, the computer readable medium comprising:

first computer executable instructions which cause a computer to sequentially execute a process of generating a random 1-variable polynomial $\xi_i(t)$ (where i is a natural number);

second computer executable instructions which cause the computer to sequentially execute a process of generating two 1-variable polynomials $u_x(t)$ and $u_y(t)$ which indicate variables x an y of the algebraic surface with a parameter t;

third computer executable instructions which cause the computer to sequentially execute a process of generating the section $D:(x, y, t)=(u_x(t), u_y(t), t)$ on the basis of the 1-variable polynomials $u_x(t)$ and $u_y(t)$; and fourth computer executable instructions which cause the computer to sequentially execute a process of generating a fibration $X(x, y, t)$ of the algebraic surface X which has the section D on the basis of the 1-variable polynomial $\xi_i(t)$ and the section D.

13. An encryption method executed by an encryption apparatus for encrypting a message m on the basis of a fibration $X(x, y, t)=0$ of an algebraic surface X which is a public key, the public key corresponding to private keys, the private keys for decryption being two or more sections corresponding to the fibration $X(x, y, t)$ of the algebraic surface X, the encryption method comprising:

embedding the message m as coefficients of a plaintext polynomial m(t) with a degree not higher than a degree (r−1);

generating random polynomials p(x, y, t) and q(x, y, t) each having three variables x, y, and t;

generating a random 1-variable irreducible polynomial f(t) with a degree not lower than a degree r; and generating ciphertext $F=E_{pk}(m, p, q, f, X)$ from the plaintext polynomial m(t) by encryption processing of performing computation including at least one of addition, subtraction, and multiplication of the polynomials p(x, y, t), q(x, y, t), and f(t) and the defining equation $X(x, y, t)$ with respect to the plaintext polynomial m(t);

wherein the message m is separately embedded in the coefficients of the plaintext polynomial m(t) with one variable t and a degree not higher than the degree (r−1) and some coefficients of a candidate for the 1-variable irreducible polynomial f(t), and the 1-variable irreducible polynomial f(t) is generated by setting, to a random value, a coefficient of the coefficients of the candidate for the 1-variable irreducible polynomial f(t) in which the message m is not embedded.

14. An encryption method executed by an encryption apparatus for encrypting a message m on the basis of a fibration $X(x, y, t)=0$ of an algebraic surface X which is a public key, the public key corresponding to a private key, the private key for decryption being one section corresponding to the fibration $X(x, y, t)$ of the algebraic surface X, the encryption method comprising:

embedding the message m as coefficients of a plaintext polynomial m(t) with a degree not higher than a degree (r−1);

generating two pairs of random polynomials $q_1(x, y, t)$ and $q_2(x, y, t)$, and $p_1(x, y, t)$ and $p_2(x, y, t)$ each having three variables x, y, and t;

generating a random 1-variable irreducible polynomial f(t) with a degree not lower than a degree r; and generating a plurality of ciphertexts $F_1=E_{pk}(m, p_1, q_1, f, X)$ and $F_2=E_{pk}(m, p_2, q_2, f, X)$ from the plaintext polynomial m(t) by encryption processing of performing computation including at least one of addition, subtraction, and multiplication of the 1-variable irreducible polynomial f(t), two pairs of random polynomials $q_1(x, y, t)$ and $q_2(x, y, t)$, and $p_1(x, y, t)$ and $p_2(x, y, t)$ at least one pair of which are different from each other, and the fibration $X(x, y, t)$ of the algebraic surface X which is opened to the public;

wherein the message m is separately embedded in the coefficients of the plaintext polynomial m(t) with one variable t and a degree not higher than the degree (r−1) and some coefficients of a candidate for the 1-variable irreducible polynomial f(t), and the 1-variable irreducible polynomial f(t) is generated by setting, to a random value, a coefficient of the coefficients of the candidate for the 1-variable irreducible polynomial f(t) in which the message m is not embedded.

15. A decryption method executed by a decryption apparatus for decrypting a message m from a ciphertext $F=E_{pk}(m, p, q, f, X)$ on the basis of two sections $D_1$ and $D_2$ which are private keys to be held in advance and correspond to a fibration $X(x, y, t)=0$ of an algebraic surface X, in inputting the ciphertext F which is generated from a plaintext polynomial m(t) in which the message m is embedded as coefficients of a plaintext polynomial m(t) with one variable t and a degree not higher than a degree (r−1) by encryption processing of performing computation including at least one of addition, subtraction, and multiplication of random polynomials p(x, y, t) and q(x, y, t) each having three variables x, y, and t , a 1-variable irreducible polynomial f(t) with a degree not lower than a degree r, and the fibration $X(x, y, t)$ of the algebraic surface X which is a public key with respect to the plaintext polynomial m(t), the decryption method comprising:

substituting the sections $D_1$ and $D_2$ into the input ciphertext F to generate two 1-variable polynomials $h_1(t)$ and $h_2(t)$;

subtracting the 1-variable polynomials $h_1(t)$ and $h_2(t)$ from each other to obtain a subtraction result $\{h_1(t)-h_2(t)\}$;

factorizing the subtraction result $\{h_1(t)-h_2(t)\}$;

extracting an irreducible polynomial f(t) having a highest degree from the factorization result; and computing a remainder by dividing the 1-variable polynomial $h_1(t)$ by the irreducible polynomial f(t) to obtain a plaintext polynomial m(t) as the remainder;

wherein the message m is separately embedded in the coefficients of the plaintext polynomial m(t) with one variable t and a degree not higher than the degree (r−1) and some coefficients of a candidate for the 1-variable irreducible polynomial f(t) with a degree not lower than the degree r, and which further comprises expanding the plaintext polynomial m(t) obtained as the remainder and the extracted irreducible polynomial f(t) to obtain the message m.

16. A decryption method executed by a decryption apparatus for decrypting a message m from a plurality of ciphertexts $F_1=E_{pk}(m, p_1, q_1, f, X)$ and $F_2=E_{pk}(m, p_2, q_2, f, X)$ on the basis of one section D which is a private key to be held in advance and corresponds to a fibration X(x, y, t)=0 of an algebraic surface X, the ciphertexts $F_1$ and $F_2$ which are generated from a plaintext polynomial m(t) in which the message m is embedded as coefficients of a plaintext polynomial m(t) with one variable t and a degree not higher than a degree (r−1) by encryption processing of performing computation including at least one of addition, subtraction, and multiplication of a random 1-variable irreducible polynomial f(t) with a degree not lower than a degree r, two pairs of random polynomials $q_1(x, y, t)$ and $q_2(x, y, t)$, and $p_1(x, y, t)$ and $p_2(x, y, t)$, and the fibration X(x, y, t) of the algebraic surface X which is opened to the public with respect to the plaintext polynomial m(t), the decryption method comprising:

substituting the section D into the two input ciphertexts $F_1$ and $F_2$ to generate two 1-variable polynomials $h_1(t)$ and $h_2(t)$;

subtracting the 1-variable polynomials $h_1(t)$ and $h_2(t)$ from each other to obtain a subtraction result $\{h_1(t)-h_2(t)\}$;

factorizing the subtraction result $\{h_1(t)-h_2(t)\}$;

extracting an irreducible polynomial f(t) having a highest degree from the factorization result; and computing a remainder by dividing the 1-variable polynomial $h_1(t)$ by the irreducible polynomial f(t) to obtain a plaintext polynomial m(t) as the remainder;

wherein the message m is separately embedded in the coefficients of the plaintext polynomial m(t) with one variable t and a degree not higher than the degree (r−1) and some coefficients of the 1-variable irreducible polynomial f(t) with a degree not lower than the degree r, and which further comprises expanding the plaintext polynomial m(t) obtained as the remainder and the extracted irreducible polynomial f(t) to obtain the message m; and computing a remainder by dividing the 1-variable polynomial $h_2(t)$ by the irreducible polynomial f(t) to obtain a plaintext polynomial m(t) as the remainder; and verifying that the two plaintext polynomials m(t) obtained in the remainder computing steps coincide with each other, by comparing the plaintext polynomials.

17. A key generation method executed by a key generation apparatus for generating a fibration X(x, y, t) of an algebraic surface X which is a public key for encrypting a message m and two sections $D_1$ and $D_2$ which are private keys for decrypting the encrypted message m and correspond to fibration X(x, y, t)=0 of the algebraic surface X, the key generation method comprising:

generating a random 1-variable polynomial $\lambda_x(t)$;

generating a 1-variable polynomial $\lambda_y(t)$ which is divisible by the 1-variable polynomial $\lambda_x(t)$;

generating two 1-variable polynomials $u_x(t)$ and $v_x(t)$ each indicating a variable x with a parameter t on the basis of the 1-variable polynomial $\lambda_x(t)$ so as to make a difference $\{u_x(t)-v_x(t)\}$ between the two 1-variable polynomials become equal to $\lambda_y(t)$;

generating two 1-variable polynomials $u_y(t)$ and $v_y(t)$ each indicating a variable y with a parameter t on the basis of the 1-variable polynomial $\lambda_y(t)$ so as to make a difference $\{u_x(t)-v_x(t)\}$ between the two 1-variable polynomials become equal to $\lambda_y(t)$;

generating the two sections $D_1$:(x, y, t)=$(u_x(t), u_y(t), t)$ and $D_2$:(x, y, t)=$(v_x(t), v_y(t), t)$ on the basis of the 1-variable polynomials $u_x(t), v_x(t), u_y(t),$ and $v_y(t)$; and generating a fibration X(x, y, t) of the algebraic surface X which has the sections $D_1$ and $D_2$.

18. A key generation method executed by a key generation apparatus for generating a fibration X(x, y, t) of an algebraic surface X which is a public key for encrypting a message m and a section D which is a private key for decrypting the encrypted message m and corresponds to the fibration X(x, y, t)=0 of the algebraic surface X, the key generation method comprising:

generating a random 1-variable polynomial $\xi_i(t)$ (where i is a natural number);

generating two 1-variable polynomials $u_x(t)$ and $u_y(t)$ which indicate variables x and y of the algebraic surface with a parameter t;

generating the section D:(x, y, t)=$(u_x(t), u_y(t), t)$ on the basis of the 1-variable polynomials $u_x(t)$ and $u_y(t)$; and generating a fibration X(x, y, t) of the algebraic surface X which has the section D on the basis of the 1-variable polynomials $\xi_i(t)$ and the section D.

* * * * *